US010345151B1

(12) United States Patent
Sarkar et al.

(10) Patent No.: US 10,345,151 B1
(45) Date of Patent: Jul. 9, 2019

(54) USE OF MULTIPLE CALIBRATED AMBIENT COLOR SENSOR MEASUREMENTS TO GENERATE A SINGLE COLORIMETRIC VALUE

(71) Applicant: MICROSOFT TECHNOLOGY LICENSING, LLC, Redmond, WA (US)

(72) Inventors: Abhijit Sarkar, Woodinville, WA (US); Stefan Angelevski, Bellevue, WA (US); Samu Matias Kallio, Redmond, WA (US); Hiroo Umeno, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/969,735

(22) Filed: May 2, 2018

(51) Int. Cl.
*G01J 1/42* (2006.01)
*G01J 3/46* (2006.01)
*G01J 3/50* (2006.01)

(52) U.S. Cl.
CPC ............ *G01J 3/50* (2013.01); *G01J 1/4204* (2013.01); *G01J 2003/467* (2013.01)

(58) Field of Classification Search
CPC ....... G01J 3/50; G01J 1/4204; G01J 2003/467
See application file for complete search history.

(56) References Cited

U.S. PATENT DOCUMENTS

| 7,134,737 | B2* | 11/2006 | Vilanova | ................ B41J 2/2132 347/19 |
| 8,648,550 | B2 | 2/2014 | Staab | |
| 9,163,990 | B2 | 10/2015 | Lianza et al. | |
| 2010/0079779 | A1* | 4/2010 | Kuno | .................. H04N 1/6027 358/1.9 |
| 2010/0085487 | A1 | 4/2010 | Sarkar et al. | |
| 2010/0163717 | A1 | 7/2010 | Chang et al. | |
| 2012/0001841 | A1 | 1/2012 | Gokingco et al. | |
| 2013/0033528 | A1 | 2/2013 | Sarkar et al. | |
| 2014/0044352 | A1 | 2/2014 | Sarkar et al. | |
| 2014/0247984 | A1 | 9/2014 | Sarkar et al. | |
| 2015/0092186 | A1 | 4/2015 | Wieser et al. | |
| 2015/0235348 | A1 | 8/2015 | Sarkar et al. | |
| 2016/0104284 | A1 | 4/2016 | Maguire et al. | |
| 2016/0232828 | A1 | 8/2016 | Jia et al. | |

(Continued)

*Primary Examiner* — Dominic J Bologna
(74) *Attorney, Agent, or Firm* — NovoTechIP International PLLC

(57) ABSTRACT

Systems and methods for determining a colorimetric value from color measurements for multiple ambient color sensors which for each color measurement, in various approaches, select a lighting cluster similar to the color measurement and determine whether the color measurement is valid or invalid based on a calculated similarity between the color measurement and the selected lighting cluster, calculate a weight for the color measurement for combination with other color measurements based on the calculated similarity between the color measurement and its selected lighting cluster, determine whether the color measurement is valid or invalid based on perceptual color space distances for the color measurement for multiple reference light sources, and/or calculate a weight for the color measurement for combination with other color measurements based on the perceptual color space distances for multiple reference light sources.

20 Claims, 16 Drawing Sheets

(56) References Cited

U.S. PATENT DOCUMENTS

2016/0370231 A1 12/2016 Agahian et al.
2017/0084250 A1 3/2017 Jia et al.
2017/0345352 A1 11/2017 Hemminki et al.

* cited by examiner

USE OF MULTIPLE CALIBRATED AMBIENT COLOR SENSOR MEASUREMENTS TO GENERATE A SINGLE COLORIMETRIC VALUE

BACKGROUND

Obtaining accurate colorimetric value using an ambient color sensor (which may also be referred to as a "color sensing ambient light sensor") is important in realizing effective ambient-adaptive display color rendering. Use of multiple ambient color sensors in a single electronic device or system, as proposed in this disclosure, presents issues in coordinating collection of and processing multiple colorimetric measurements to produce accurate colorimetric values that previously have gone unappreciated and unaddressed.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

In FIGS. 5D and 5E, a multi-step clustering, involving first and second automated clustering operations, is performed.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. In the following material, indications of direction, such as "top" or "left," are merely to provide a frame of reference during the following discussion, and are not intended to indicate a required, desired, or intended orientation of the described articles unless expressly indicated.

Figure 1A:
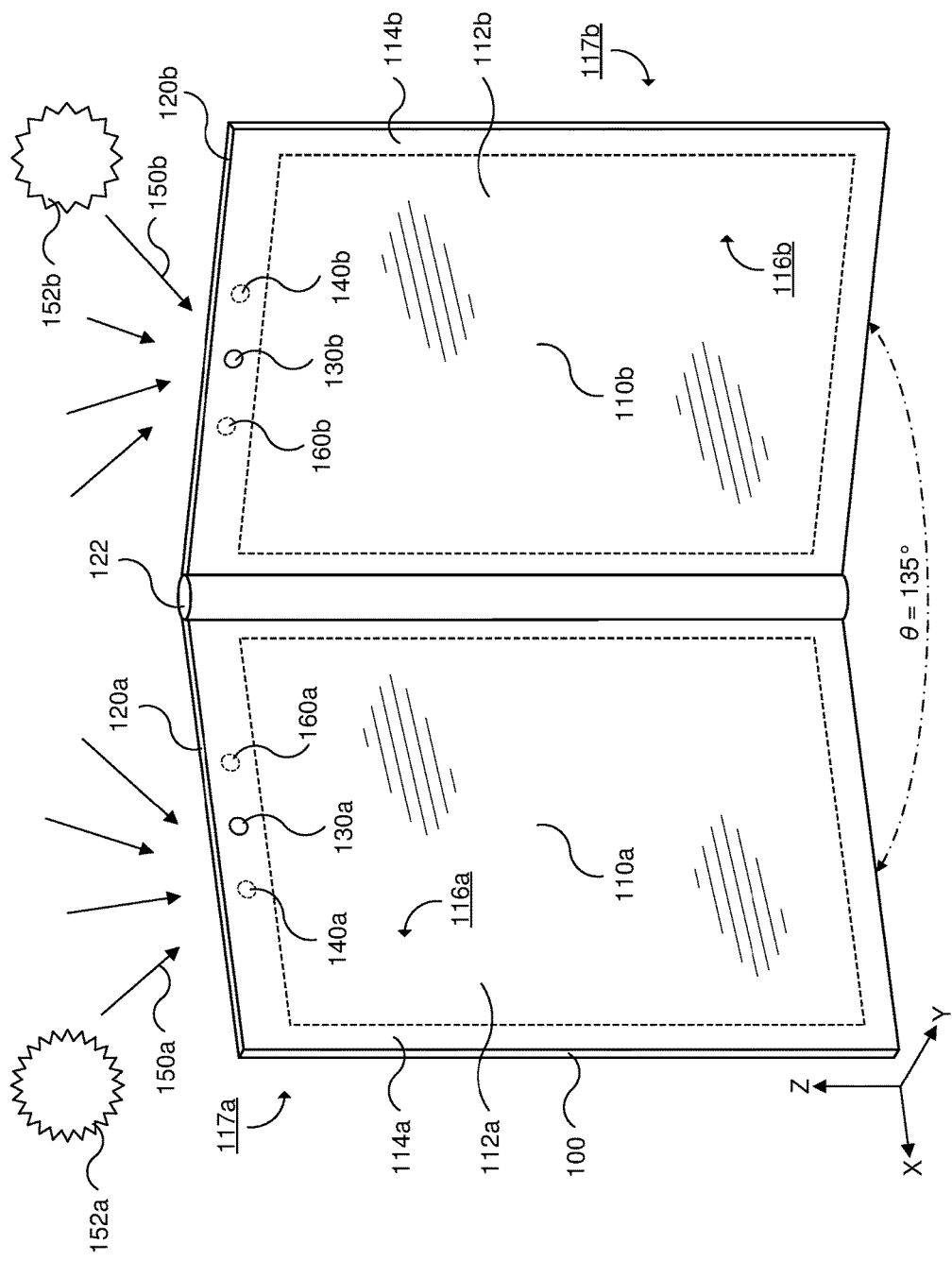
FIGS. 1A-1G illustrate an example electronic device that includes multiple ambient color sensors, with the electronic device shown in various physical configurations.

FIGS. 1A-1G illustrate an example electronic device 100 that includes multiple ambient color sensors, with the electronic device 100 shown in various physical configurations. In FIG. 1A, the electronic device 100 is in an open configuration, at an angle θ of about 135 degrees relative to a closed configuration (illustrated in FIG. 1B). In the particular example illustrated in FIG. 1A, the electronic device 100 is embodied as a foldable portable computing device. The electronic device 100 may also be embodied as one or more other computing devices such as, but not limited to, a laptop computer, a desktop computer and monitor, a smartphone, a media player, an image recorder (for example, a still image camera, video camera, or device including a still image and/or video camera), or other handheld or portable electronic device, a smaller device such as a wrist-watch device, a pendant device, a headphone or earpiece device, a device embedded in eyeglasses or other equipment worn on a user's head, or other wearable or miniature device, a television, a computer display, a gaming device, a navigation device, an embedded system such as a system in which electronic equipment with a display is mounted in a kiosk or automobile, equipment that implements the functionality of two or more of these devices, or other electronic equipment. The electronic device 100 may be more simply referred to as a device.

In the particular example illustrated in FIG. 1A, the electronic device 100 includes a first panel 120a and a second panel 120b. In some examples, as illustrated in FIG. 1A, the electronic device 100 includes a hinge 122 which is coupled to the first panel 120a and the second panel 120b and allows the first panel 120a and the second panel 120b to be folded at various angles relative to each other. In some implementations, the electronic device 100 includes an angular sensor (not illustrated in FIG. 1A) that is configured to measure and provide an indication of an angle θ at which the first panel 120a and the second panel 120b are disposed. In some embodiments, a portion of the angular sensor is included in the hinge 122. In some embodiments, the angular sensor indicates only a few discrete configurations, such as, but not limited to, fully closed, fully open, low angle opening (for example, open at an angle θ less than or equal to a threshold angle, such as 45 degrees), and/or open flat. The first panel 120a, the second panel 120b, and/or the hinge 122 may be referred to, individually or in combination, as a housing, case, or enclosure. In some implementations, the electronic device 100 and/or the hinge 122 may be embodied at least in part as described in U.S. Patent Application Publication Numbers 2017/0357294 (published on Dec. 14, 2017 and entitled "Hinged Device"), 2018/0059735 (published on Mar. 1, 2018 and entitled "Hinged Device"), and/or 2018/0066465 (published on Mar. 8, 2018 and entitled "Hinged Device"), which are each incorporated by reference herein in their entireties.

The electronic device 100 includes a first display device 110a (which may be referred to as a display) mounted in the first panel 120a. The first display device 110a may be protected by a cover layer comprising materials such as, but not limited to, glass, plastic, or sapphire. One or more openings may be formed in the cover layer and/or the first panel 120a to accommodate components such as, but not limited to, buttons, speakers, communications ports, and sensors. The first display device 110a includes an array of pixel elements arranged to emit light through the cover layer to a user of the electronic device 100 in response to signals received from control circuitry included in the electronic device 100. The first display device 110a may be implemented using liquid crystal display (LCD), organic light emitting diode (OLED), or other display technologies. The array of pixel elements defines a first active area 112a used to display images.

In some embodiments, a first inactive area 114a may run along one or more edges of the first active area 112a. The first inactive area 114a may be referred to as a bezel. In FIG. 1A, the first inactive area 114a forms a border running fully around the first active area 112a. The first inactive area 114a may contain circuits, signal lines, sensors, or other structures, some or all of which may be hidden from view of a user of the electronic device 100 with an opaque masking layer, such as a layer of black ink or paint on an underside of the cover layer. Optical components (for example, a camera, camera flash lighting, a light-based proximity sensor, an ambient color sensor (which may be referred to as a light sensor), and/or status indicator light-emitting elements) may be positioned under the first inactive area 114a. One or more openings (which may also be referred to as windows or apertures) may be formed in the opaque masking layer to accommodate such optical components. In some implementations, the optical components may instead be positioned under the first active area 112a and arranged to receive and/or transmit light through the first display device 110a. In such implementations, the electronic device 100 may not include the first inactive area 114a, and instead have the first active area 112a occupy substantially all of a front surface 116a of the first panel 120a, providing a display surface without, or substantially without, a bezel.

In some implementations, as illustrated in FIG. 1A, a first opening 130a is provided in the first inactive area 114a for a camera. In some examples, another type of sensor may be used instead of, or in addition to, the camera in combination with the first opening 130a. The first opening 130a provides a substantially clear, non-opaque, region in the first inactive layer 114a that minimizes a reduction in optical transmission to the camera, although also making the first opening 130a and the camera visible to a user of the electronic device 100. The electronic device 100 illustrated in FIG. 1A includes a second opening 140a provided for an ambient color sensor included in the first panel 120a. In this example, an ink or other material, which may be different in material composition and/or structure than other opaque areas of the first inactive area 114a, is used for the second opening 140a, which obscures the presence of the second opening 140a to a user of the electronic device 110. Although optical transmission is reduced through the second opening 140a, there remains sufficient optical transmission at appropriate wavelengths for the ambient color sensor to receive and accurately measure first ambient light 150a (for example, light emitted by a first light source 152a and/or a second light source 152b) through the second opening 140a. In some implementations, the second opening 140a for the ambient color sensor may instead provide a substantially clear, non-opaque, region in the first inactive layer 114a as described for the first opening 130a. In some examples, the first panel 120a includes a second ambient color sensor that is arranged to receive and measure ambient light through a rear surface 117a of the first panel 120a. In some examples, the first panel 120a includes multiple ambient color sensor for the front surface 116a and/or multiple ambient color sensors for the rear surface 117a.

In some implementations, a third opening 160a is provided in the first inactive area 114a for a proximity sensor included in the first panel 120a. The third opening 160a may be configured much as described for the first opening 130a (substantially clear, non-opaque) or the second opening 140a (opaque). The proximity sensor is configured to detect the presence of nearby objects without physical contact. For example, the proximity sensor may be used to detect the presence and/or proximity of a user of the electronic device 100, and/or may be used to detect the presence and/or proximity of an object that obstructs receipt of the ambient light 150a. The first opening 130a, second opening 140a, and/or third opening 160a may each have a circular shape, a square shape, a shape with curved and/or straight edges, or any other suitable shape. The first opening 130a, second opening 140a, and/or third opening 160a may be combined, such as to provide a single opening for multiple sensors.

The second panel 120b may include any of the features described above for the first panel 120a. As illustrated in FIG. 1A, the second panel 120b may include a second display panel 110b, which may be configured as described for the first display panel 110a. As illustrated in FIG. 1A, the second panel 120b may include a second active area 112b and/or a second inactive area 114b, as described for the first active area 112a and the first inactive area 114a. As illustrated in FIG. 1A, the second panel 120b may include a fourth opening 130b, a fifth opening 140b, and/or a sixth opening 160b respectively for a camera (or other sensor), an ambient color sensor, and a proximity sensor, as described respectively for the first opening 130a, the second opening 140b, and the third opening 160b. The second panel 120b includes an ambient color sensor arranged to receive and measure second ambient light 150b (for example, light emitted by the first light source 152a and/or the second light source 152b). For example, the ambient color sensor included in the second panel 120b may be arranged to receive the second ambient light 150b through a front surface 116b of the second panel 120b or through a rear surface 117b. The ambient color sensor included in the second panel 120b is at a substantially different position than the ambient color sensor included in the first panel 120a.

Figure 1B:
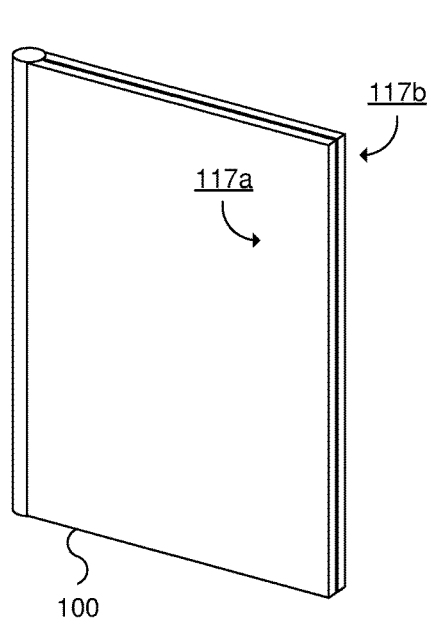
Figure 1C:
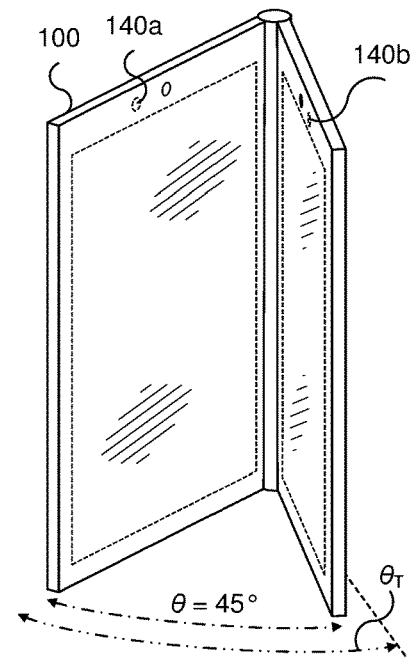

In FIG. 1B, the electronic device 100 shown in FIG. 1A is in a fully closed configuration, in which the front surfaces 116a and 116b are protected by the rear surfaces 117a and 117b. In FIG. 1C, the electronic device 100 shown in FIGS.

Figure 1D:
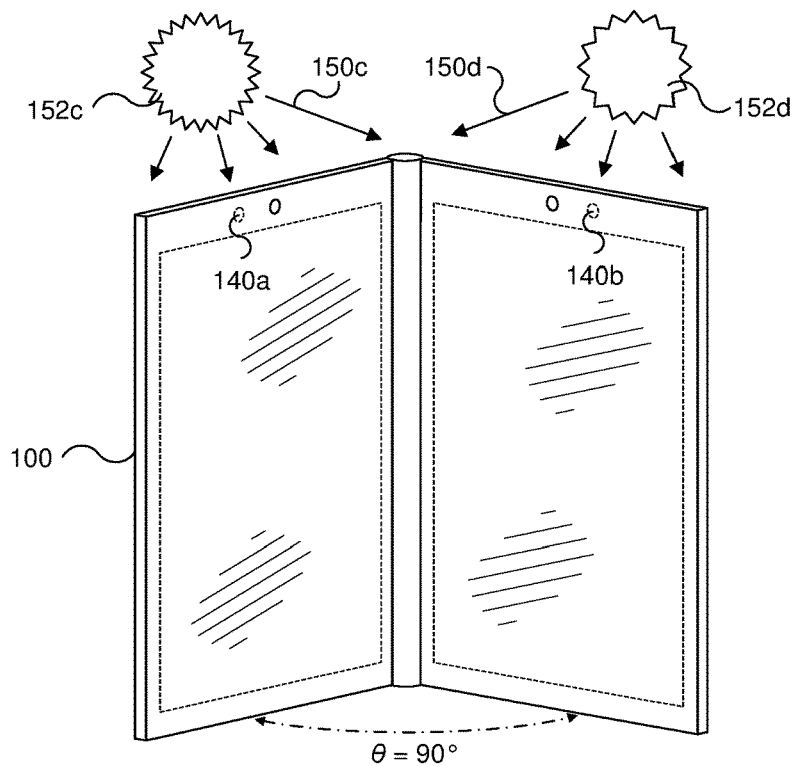
Figure 1F:
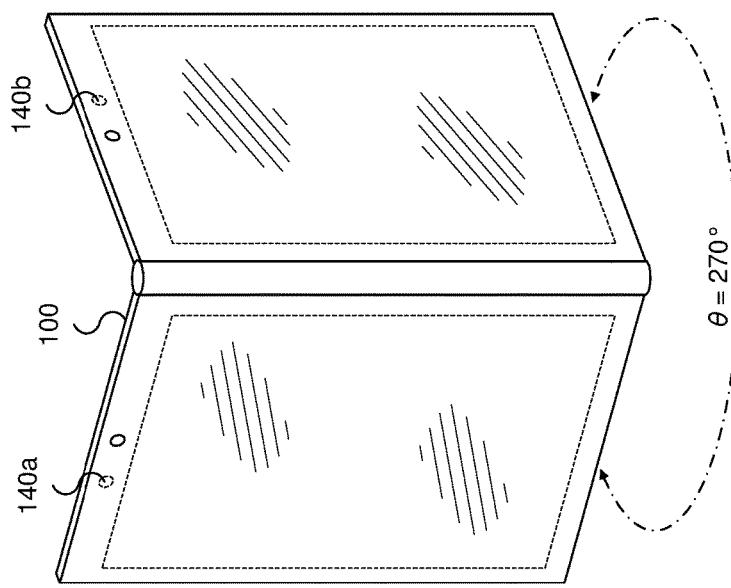
Figure 1E:
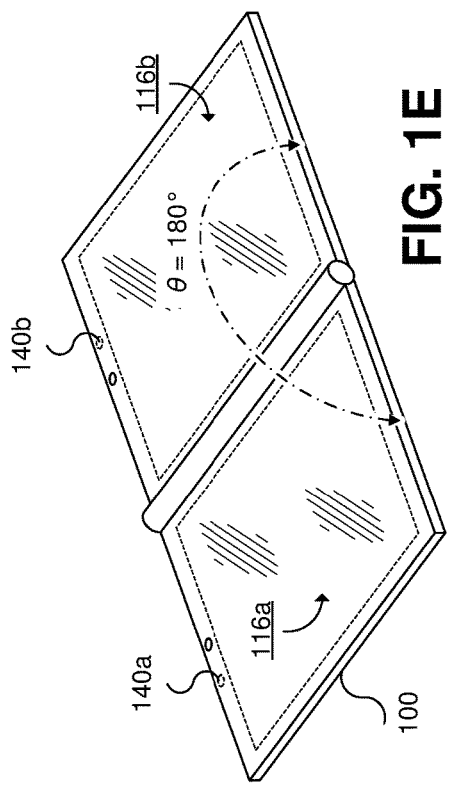
Figure 1G:
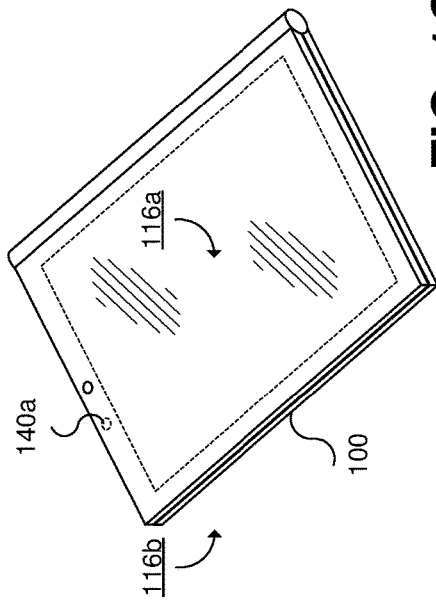

1A-1B is in a low angle opening configuration, at an angle θ of about 45 degrees. In this configuration, receipt of ambient light by the ambient color sensors corresponding to the openings 140a and 140b is obstructed by respective panels 120b and 120a. An angular sensor included in the electronic device 100 may be configured to indicate when a current angle between the first panel 120a and the second panel 120b is less than or equal to a threshold angle $θ_T$. In FIG. 1D, the electronic device 100 shown in FIGS. 1A-1C is in an open configuration, at an angle θ of about 90 degrees that is greater than the threshold angle $θ_T$ shown in FIG. 1C. In the environment and orientation in which the electronic device 100 is situated in FIG. 1D, the ambient color sensor for the first opening 140a receives substantially less of a third ambient light 150c emitted by a third light source 152c than is received by the ambient color sensor for the second opening 140b, and the ambient color sensor for the second opening 140b receives substantially less of a fourth ambient light 150d emitted by a fourth light source 152d than is received by the ambient color sensor for the first opening 140a. In FIG. 1E, the electronic device 100 shown in FIGS. 1A-1D is in an open configuration, at an angle θ of about 180 degrees. In this configuration, the first panel 120a and the second panel 120b are substantially parallel with respective front faces 116a and 116b facing in a same direction. In FIG. 1F, the electronic device 100 shown in FIGS. 1A-1E is in an open configuration, at an angle θ of about 270 degrees. In FIG. 1G, the electronic device 100 shown in FIGS. 1A-1F is in a fully flipped open configuration, in which the front surfaces 116a and 116b are both facing outward in opposing directions. The various physical configurations depicted in FIGS. 1A-1G are provided as examples and are not intended to be limiting. As illustrated by the examples illustrated in FIGS. 1A-1B, as a result of the ambient color sensors corresponding to the openings 140a and 140b being placed in various configurations, the ambient color sensors may receive ambient light from substantially different directions and/or with substantially different spectral profiles.

Figure 1H:
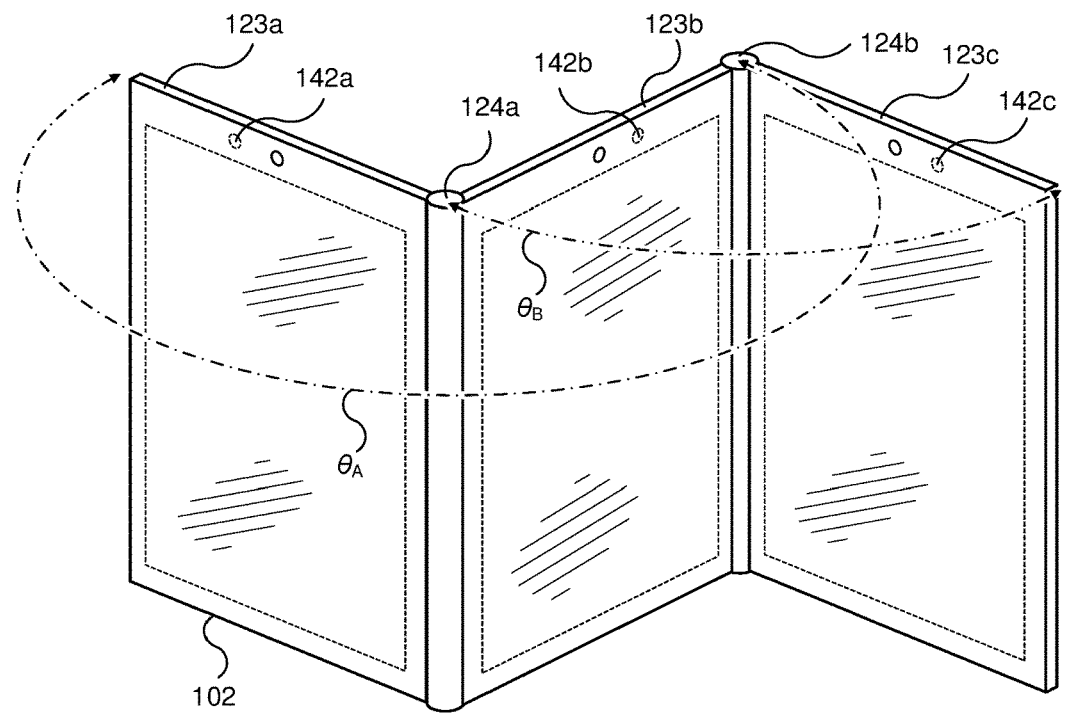
FIG. 1H illustrates an example of a second electronic device that includes multiple ambient color sensors and is also embodied as a foldable portable electronic device.

FIG. 1H illustrates an example of a second electronic device 102 that includes multiple ambient color sensors and is also embodied as a foldable portable electronic device. The second electronic device 102 includes a first panel 123a, a second panel 123b, and a third panel 123c, each including a respective ambient color sensor at respective openings 142a, 142b, and 142c. The panels 123a, 123b, and 123c may include any of the features described for the panels 120a and 120b in FIG. 1A. Much as described for the first panel 120a, the second panel 120b, and the hinge 122 in FIG. 1A, the second electronic device 102 includes a first hinge 124a between the first panel 123a and second panel 123b (with an angle $θ_A$ between the panels 123a and 123b), and includes a second hinge 124b between second panel 123b and the third panel 123c (with an angle $θ_A$ between the panels 123b and 123c).

Figure 1I:
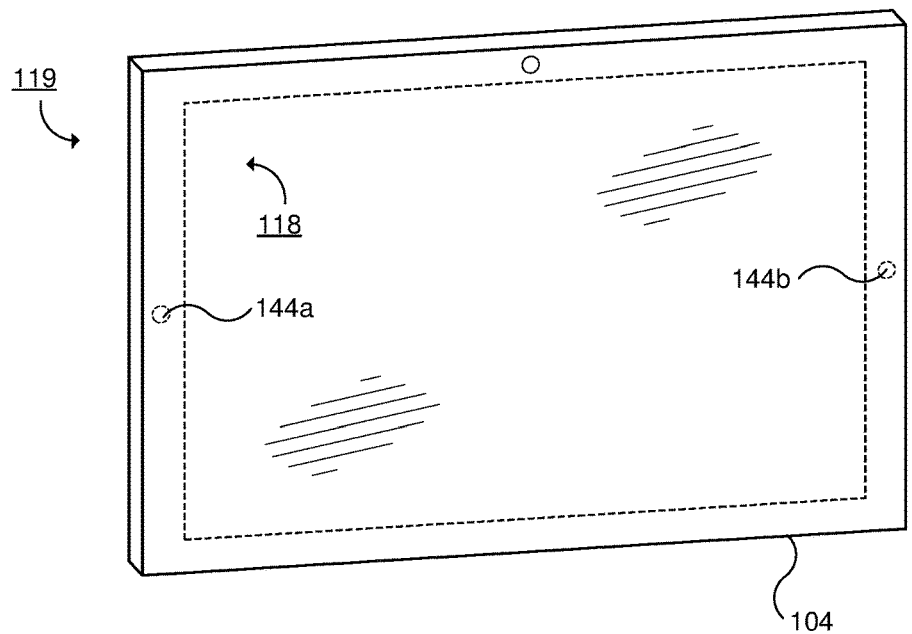
FIG. 1I illustrates an example of a third electronic device that includes multiple ambient color sensors.

FIG. 1I illustrates an example of a third electronic device 104 that includes multiple ambient color sensors, including a first ambient color sensor at a first opening 144a and a second ambient color sensor at a second opening 144b. The third electronic device 104 may include any of the features described for the first panel 120a in FIG. 1A. Unlike the first and second electronic devices 100 and 102, the third electronic device 104 does is not a foldable electronic device. In some examples, the third electronic device 104 is not embodied as a portable electronic device; for example, the third electronic device 104 may be embodied as a large-format display intended for use at a fixed location. In the example illustrated in FIG. 1I, the first and second ambient color sensors are at substantially different positions and arranged to receive ambient light via a front surface 118 of the third electronic device 104. In some examples, the first and second ambient color sensors are configured to receive ambient light from substantially different directions. In some examples, the third electronic device 104 includes an ambient color sensor arranged to receive ambient light via a rear surface of the 119 of the third electronic device 104.

Although FIGS. 1A-1I illustrate various example devices that include multiple ambient color sensors, it is noted that the techniques described herein are not limited to such examples. The described techniques can also be applied more generally to devices and/or systems including multiple ambient color sensors. The described techniques are not limited to handheld devices, portable devices, and/or mobile devices, although the techniques offer benefits to such devices due to relatively frequent changes in environment, configuration, and/or orientation encountered by such devices. The described techniques are not limited to electronic devices including panels such as the panels 120a, 120b, 123a, 123b, and 123c shown in FIGS. 1A-1H. In some implementations, the ambient color sensors do not move and/or change angle relative to each other; for example, as shown in FIG. 1I, the ambient color sensors may be at fixed positions (including angular positions). In some implementations, a device or system is configured to receive and process color measurements for ambient color sensors included in multiple devices at a same location; for example, a color measurement provided by a wrist-watch device may be processed in combination with a color measurement obtained by a tablet computer. A color measurement may be referred to as a colorimetric measurement or a colorimetric value. In some implementations, one or more ambient color sensors may be configured to receive ambient light from a limited field of view (FOV); in such implementations, ambient color sensors may be arranged to receive light from selected and known directions.

Figure 2:
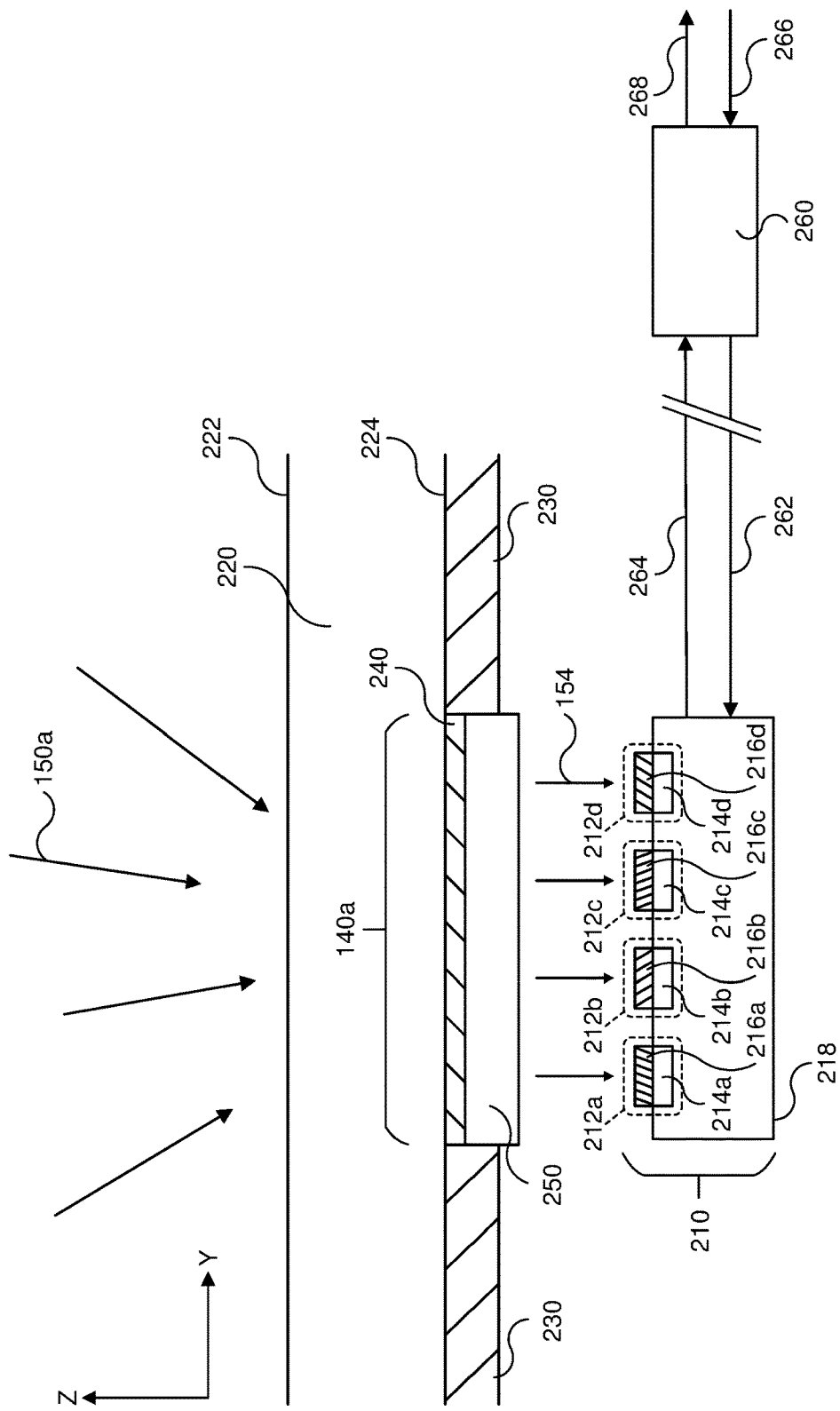
FIG. 2 is a cross-sectional view of a portion of the electronic device in FIG. 1A through an opening and an ambient color sensor arranged to receive ambient light through the opening.

FIG. 2 is a cross-sectional view of a portion of the electronic device 100 in FIG. 1A through the second opening 140a and an ambient color sensor 210 arranged to receive the first ambient light 150a through the second opening 140a. As illustrated in FIG. 2, the ambient color sensor 210 may be mounted in alignment with the second opening 140a. In the illustrated arrangement, the ambient color sensor 210 is used to measure and estimate various characteristics of the first ambient light 150a in the vicinity of the electronic device 100. As described in FIG. 1A and illustrated in FIG. 2, the electronic device 100 may include a cover layer 220 as an outermost and frontmost layer. In some implementations, the cover layer 220, or a portion of the cover layer 220, is a multilayer structure. The cover layer 220 has an outer surface 222 and an inner surface 224.

The second opening 140a may be formed from an opening in opaque masking layer 230 on the inner surface 224. The opening in the opaque masking layer 230 associated with the second opening 140a may be filled with optical structures such as an ambient light sensor ink 240 and/or light redirecting structure 250. Ambient light sensor ink 240 may have sufficient optical transmission at appropriate wavelengths for the ambient color sensor 210 to receive and accurately measure the first ambient light 150a, while at the same time enhancing the outward appearance of the second opening 140a (for example, by obscuring the presence of the second opening 140a to a user of the electronic device 100 by making the second opening 140a have a visual appearance that is similar to a portion of the cover layer 220 that includes the opaque masking layer 230). If desired, the ambient light sensor ink 240 may be omitted for the second opening 140*a*.

The light redirecting structure 250 may be used to pass the first ambient light 150*a* gathered from various angles of incidence to the ambient color sensor 210. The light redirecting structure 250 may include structures such as diffusers, prisms, and/or patterned lenses to help redirect off-axis rays of the first ambient light 150*a* onto the ambient color sensor 210 at angles that are close to parallel to the Z axis (for example, ambient light ray 154), thereby reducing the dependence of ambient light measurements on a relative orientation between the electronic device 100 and the source(s) of the first ambient light 150*a*. If desired, the light redirecting structure 250 may be omitted for the second opening 140*a*.

The ambient color sensor 210 includes multiple light detectors 212*a*, 212*b*, 212*c*, and 212*d*, which may be collectively referred to as light detectors 212. The light detectors 212*a*, 212*b*, 212*c*, and 212*d* include respective photodetectors 214*a*, 214*b*, 214*c*, and 214*d* (for example, photodiodes, phototransistors, or other semiconductor photodetector structures). The light detectors 212 may be formed on a common semiconductor substrate such as substrate 216, or may be formed using two or more substrates. In some implementations, multiple openings, similar to the second opening 140*a*, may be disposed at various positions and used for an ambient color sensor 210. Each of the light detectors 212*a*, 212*b*, 212*c*, and 212*d* may include a respective color filter 216*a*, 216*b*, 216*c*, and 216*d*. The color filters 216*a*, 216*b*, 216*c*, and 216*d* may be collectively referred to as color filters 216. The color filters 216 may be, for example, thin-film interference filters, colored layers of polymer, or other color filter elements (for example, colored filters formed using dyes and/or pigments) formed on or otherwise positioned above photodetectors 214. The light detectors 212 have substantially different spectral responses to received light, which may be due to, at least in part, substantially different spectral transmission characteristics for the color filters 216. Each light detector 212 provides an indication of an amount or intensity of received ambient light according to its spectral response. Although in the example illustrated in FIG. 2 the ambient color sensor 210 includes four light detectors 212*a*, 212*b*, 212*c*, and 212*d*, in other examples the ambient color sensor 210 may include three light detectors 212 or more than four light detectors 212, with corresponding adjustments to the techniques described herein for use and operation of the ambient color sensor 210.

The ambient color sensor 210 receives and responds to control signals 262 received from control circuitry 260 included in the electronic device 100. The control circuitry 260 is not illustrated in cross-section in FIG. 2, but instead is illustrated schematically. The ambient color sensor 210 generates and outputs sensor signals 264 indicating, among other things, amounts of light measured by the light detectors 212, which is received by the control circuitry 260. The control circuitry 260 also receives input signals 266 from other elements of the electronic device 100. In response to the sensor signals 264 and/or the input signals 266, the control circuitry generates output signals 268, which are provided to and affect the operation of other elements included in the electronic device 100. For example, the control circuitry 260 may be configured to, in response to the sensor signals 264 and input signals 266 providing image data intended for display via the first display device 110*a*, adjust a color cast of the image data (often referred to as the white point) and provide corresponding output signals 268 to the first display device 110*a*.

Other ambient color sensors (for example, multiple ambient color sensors included in a single electronic device) may be configured and operated much as described for the ambient color sensor 210. It is also noted that ambient color sensors of differing constructions may be used together with the techniques described herein.

Figure 3A:
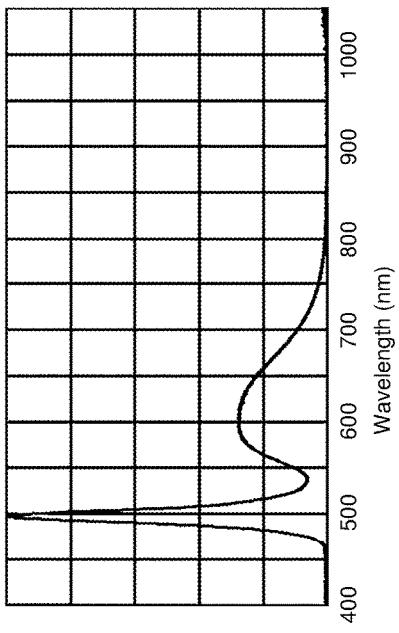
FIGS. 3A-3D illustrate examples of spectral emission profiles for various types of light sources.
Figure 3B:
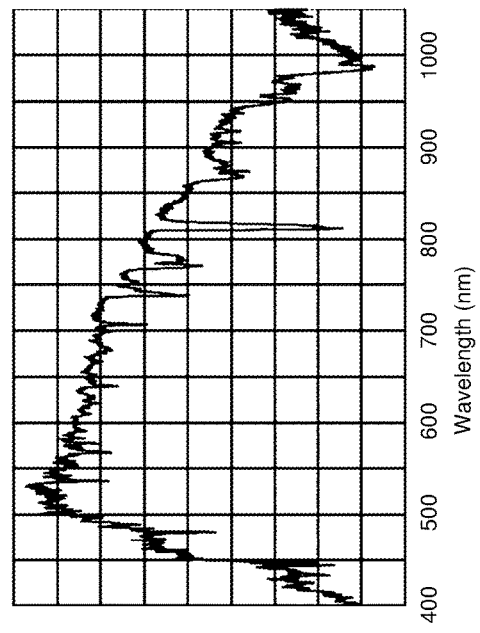
Figure 3C:
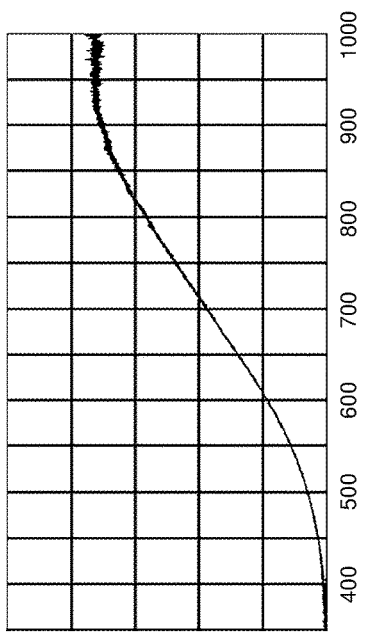
Figure 3D:
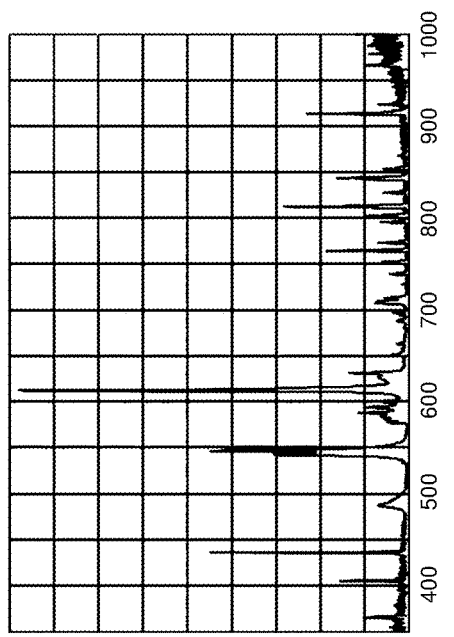

FIGS. 3A-3D illustrate examples of spectral emission profiles for various types of light sources. FIG. 3A illustrates a spectral emission profile for an example halogen bulb based light source. FIG. 3B illustrates a spectral emission profile for an example white light emitting diode (LED) based light source. FIG. 3C illustrates a spectral emission profile for an example fluorescent light based light source. FIG. 3D illustrates a spectral emission profile for sunlight. As can be seen from the examples in FIGS. 3A-3D, spectral emission profiles may vary widely across various light sources. Even where two light sources are determined to have a similar color temperature, they may have very different spectral emission profiles. For example, a halogen bulb with 3000K color temperature has a significantly different spectral emission profile from a 3000K warm white LED lamp and a 3000K warm white compact fluorescent light (CFL). This introduces challenges in accurately estimating color chromaticities for different ambient lighting circumstances based on measurements obtained using the light detectors 212 included in the ambient color sensor 210.

Figure 3E:
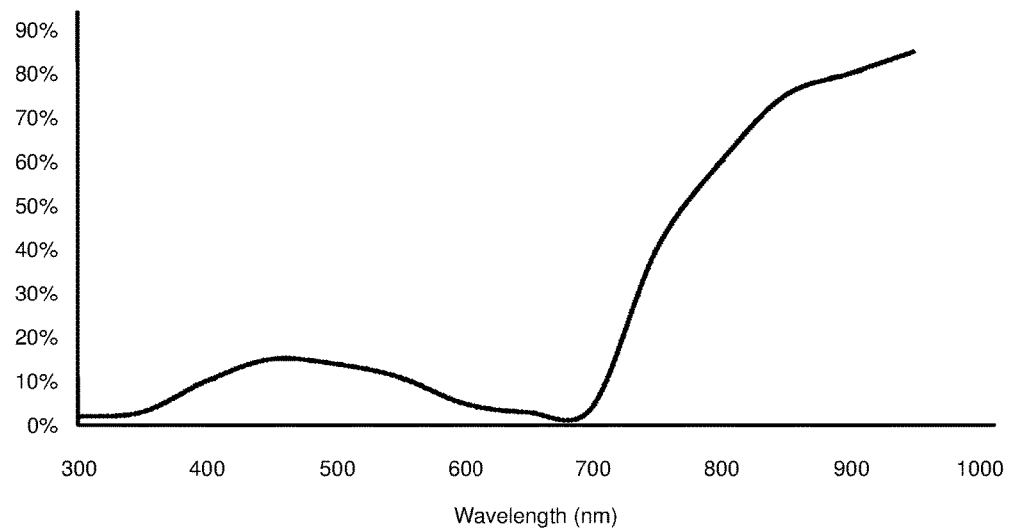
FIG. 3E illustrates an example of a spectral transmission profile for an ambient light sensor ink.

FIG. 3E illustrates an example of a spectral transmission profile for an ambient light sensor ink, such as the ambient light sensor ink 240. As seen in FIG. 3E, there is very low transmission of visible light through the ambient light sensor ink, while there is an increasing and significantly greater transmission of infrared (IR) wavelengths. The ambient color sensor 210 is configured to perform measurements of light received through the ambient light sensor ink that, across a wide range of light intensities, allows accurate color estimation to be performed.

Figure 3F:
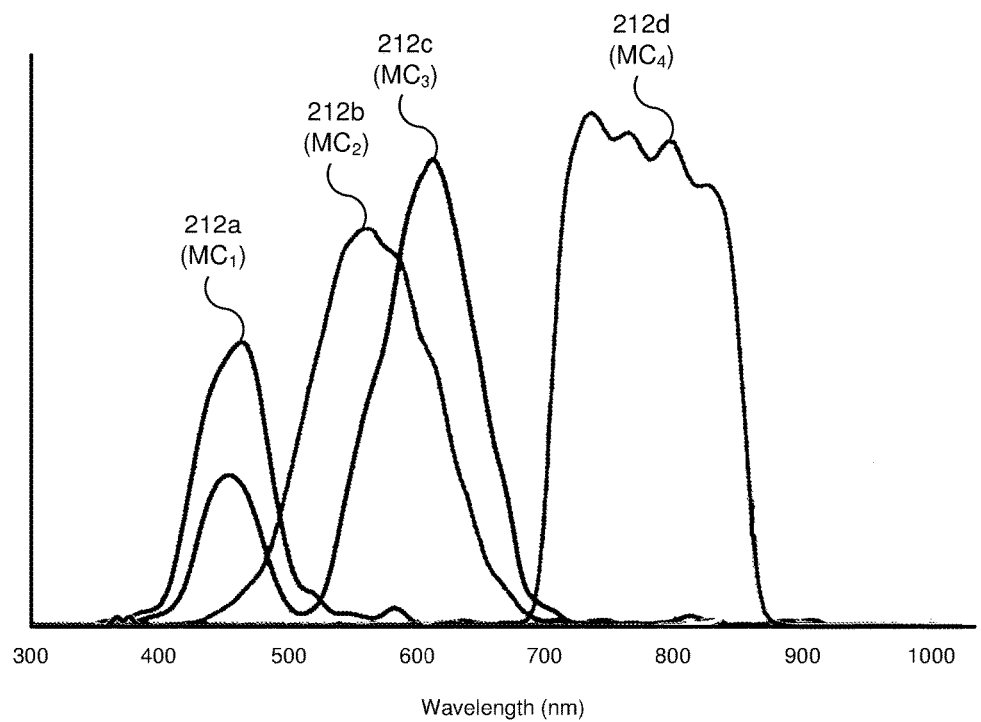
FIG. 3F illustrates an example of spectral response curves for the four light detectors included in the ambient color sensor in FIG. 2.

FIG. 3F illustrates an example of spectral response profiles for the four light detectors 212*a*, 212*b*, 212*c*, and 212*d* included in the ambient color sensor 210 in FIG. 2. The light detectors 212 have substantially different responses to received light intensity at various wavelengths, which may be due to, at least in part, substantially different spectral transmission profiles for the color filters 216. The light detector 212*a* (providing a color measurement component labeled "$MC_1$") is most responsive to blue wavelengths. The light detector 212*b* (providing a color measurement component labeled "$MC_2$") is most responsive to green and yellow wavelengths, and has an overlapping spectral response with the light detector 212*a*. The light detector 212*c* (providing a color measurement component labeled "$MC_3$") is most responsive to red and orange wavelengths, and has an overlapping spectral response with the light detectors 212*a* and 212*b*. The light detector 212*d* (providing a color measurement component labeled "$MC_4$") is most responsive to infrared wavelengths. It is noted that the term "color measurement component" is not limited to a value directly reported by an ambient light sensor, but also a derived indication of measured light intensity; for example, offset, scaling, or other transformations of an initial value received from an ambient light sensor that provides an indication of measured light intensity. This also includes, for example, an average of values obtained from multiple measurements. For purposes of this discussion, the term "average" includes, but is not limited to, an arithmetic mean (for which there are various algorithms), a median, or a mode.

The ambient light 150a measured by each of the light detectors 212 passes through an "optical stack" of materials: the cover layer 220, optical ink 240, light redirecting structure 250, and color filters 216, each of which may be affected by manufacturing variations resulting in individual variations in spectral transmission to the light detectors 212 for each installed ambient color sensor 210 through its respective optical stack. In addition, manufacturing variations may also affect active semiconductor elements of the ambient color sensor 210 (for example, light detectors 212 and/or analog to digital converters (ADCs)), resulting in variations in spectral sensitivity, gain, and/or offset. A sensor specific calibration is useful for improving the accuracy of color values despite such variations in performance.

Figure 4:
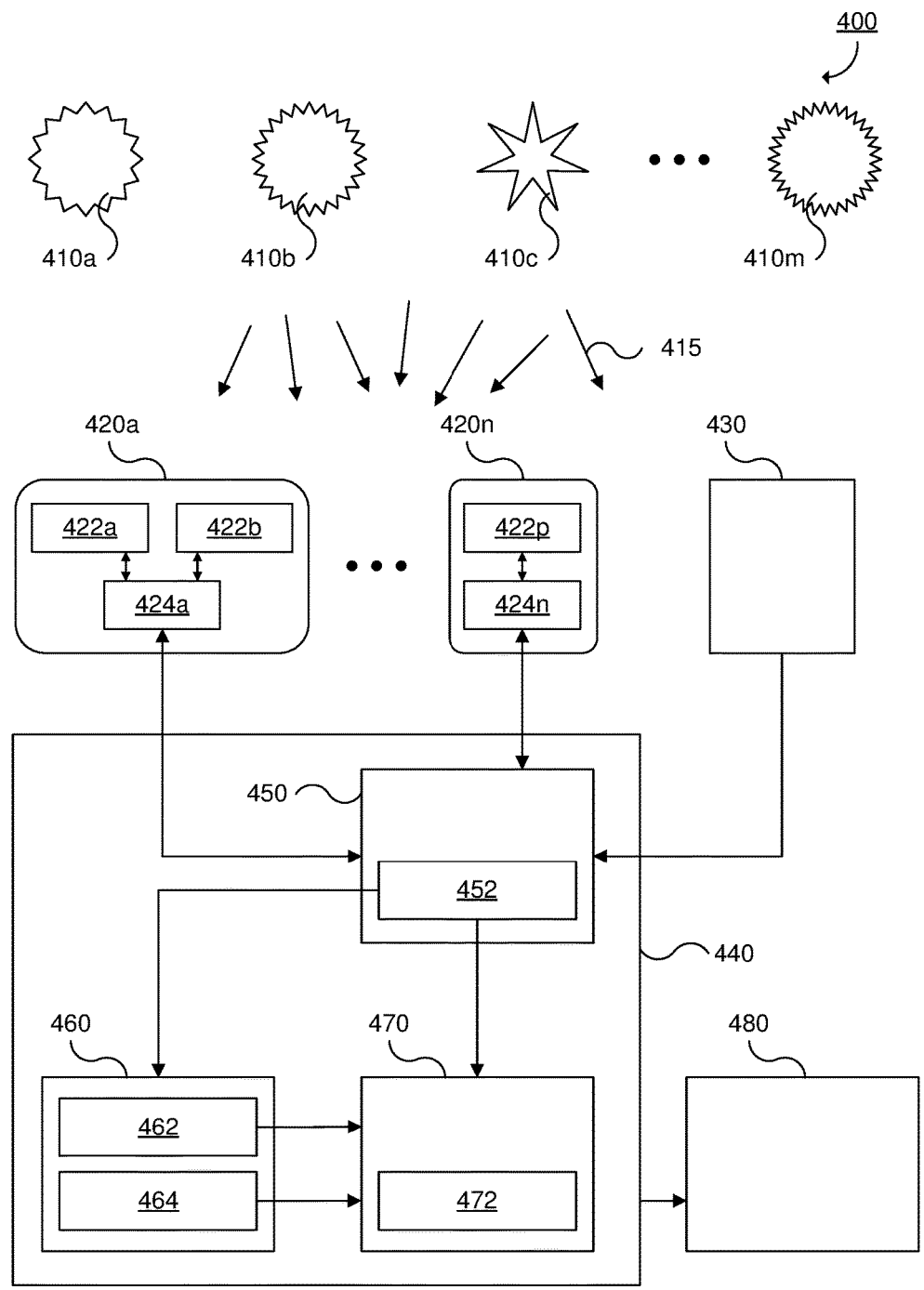
FIG. 4 illustrates an example of an ambient lighting characterization system adapted to characterize responses of ambient color sensors to various ambient lighting scenarios.

FIG. 4 illustrates an example of an ambient lighting characterization system 400 (which may be referred to as characterization system 400) adapted to characterize responses of ambient color sensors to various ambient lighting scenarios. The characterization system 400 includes a plurality of light sources 410a-410m (which may be collectively referred to as light sources 410) providing various spectral emission profiles such as, but not limited to, the spectral emission profiles illustrated in FIGS. 3A-3D. A light source refers to one or more light emitting components, which may each include multiple discrete light emitting elements, with substantially similar spectral emission profiles. Additionally, the light sources 410 may exhibit a range of color temperatures and light emitting technologies (such as, but not limited to, incandescent, halogen, fluorescent, CFL, and LED). Each of the light sources 410 is configured to be selectively enabled or disabled to provide ambient light 415, and combinations of the light sources 410 may be enabled concurrently to produce ambient light 415 presenting mixed light conditions. In some examples, a portion of the light sources 410 are configured to perform dimming to a selected degree. Selective enabling/disabling and/or dimming of the light sources 410 may be performed under control of a measurement collection module 450, which is described in further detail below.

The characterization system 400 includes a plurality of reference sensor devices 420a-420n (which may be collectively referred to as reference sensor devices 420 or reference devices 420) each including one or more of ambient color sensor 422a-422p (which may be collectively referred to as ambient color sensors 422 or reference sensors 422), which may include the various features described for the ambient color sensor 210 in FIG. 2. In the example illustrated in FIG. 4, the reference sensor device 420a includes two ambient color sensors 422a and 422b, much as described for the electronic device 100 shown in FIGS. 1A-1G.

Each of the reference sensor devices 420a-420n also includes a respective measurement control module 424a-424n configured to receive commands from the measurement collection module 450, control ambient color sensors 422 included in the reference sensor device 420 according to the received commands (including, for example, setting operating parameters and/or initiating measurement operations), obtain sensor signals from the ambient color sensors 422 included in the reference sensor device 420, and provide the sensor signals to the measurement collection module 450. The reference sensor devices 420 are constructed with an optical stack as described in FIG. 2, with the optical stack and ambient color sensors 422 being representative of those used in electronic devices used by end users, such as the electronic device 100 described in FIGS. 1A-1I and 2. However, the reference sensor devices 420 may be prototype or incomplete devices not including all of the components or features provided in end user electronic devices.

The characterization system 400 may also include a reference spectrometer 430 used to perform accurate color measurements of ambient light 415. For example, the reference spectrometer 430 may be configured to provide color measurements as CIE 1931 XYZ tristimulus values. The measurement collector 450 may be configured to automatically receive color measurements of ambient light 415 from the reference spectrometer 430.

The characterization system 400 includes a sensor analysis system 440, which includes the measurement collection module 450. The measurement collection module 450 is configured to collect color measurements from the reference sensor devices 420 for each of the reference sensors 422 for each of a plurality of selected ambient lighting scenarios presenting different spectral emission profiles. As mentioned previously, in some implementations the measurement collection module 450 is configured to automatically control and configure the light sources 410 to selectively enable/disable and/or dim individual light sources 410 to present each of the plurality of ambient lighting scenarios. In some examples, the measurement collection module 450 is configured to automatically control and configure dimming of individual light sources 410 to present ambient lighting scenarios with various illuminances. Each different illuminance (or lux level) used for an ambient lighting scenario with a given color temperature may be referred to as an ambient lighting condition. In some examples in which the measurement collection module 450 receives color measurements of ambient light 415 from the reference spectrometer 430, the measurement collection module 450 may be configured to control dimming of one or more light sources 410; for example, to achieve a selected illuminance. Additionally, in some examples one or more of the plurality of ambient lighting scenarios is achieved with two or more of the light sources 410 concurrently enabled, to present and obtain measurements for mixed lighting conditions, as such mixed lighting conditions may be encountered by end users.

The measurement collection module 450 collects one or more color measurements from each of the reference sensors 422 for each of the plurality of selected ambient lighting scenarios at one or more selected illuminances. In some examples, for each selected ambient lighting condition, multiple color measurements may be obtained from a reference sensor 422, with the reference sensor 422 positioned in a different orientation for each color measurement, in order to also measure and characterize off-axis responses of the reference sensors 422. The measurement collection module 450 is also configured to collect color measurements from the reference spectrometer 430 for each selected ambient lighting condition. The measurement collection module 450 is configured to store the color measurements obtained for the reference sensors 422 and the reference spectrometer 430, as well as to provide the stored color measurements 452 in response to requests from other modules and/or systems. In some examples, each reference sensor 422 is configured to use a predetermined gain level and/or a predetermined integration time for collecting color measurements.

Figure 5A:
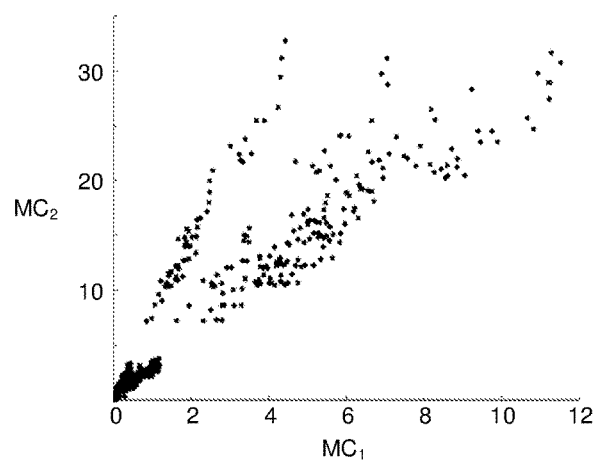
FIGS. 5A-5C illustrate an example of color measurements collected by the measurement collection module in FIG. 4.
Figure 5B:
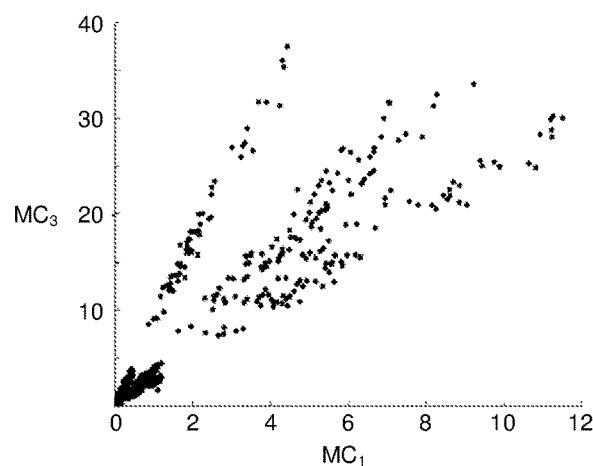
Figure 5C:
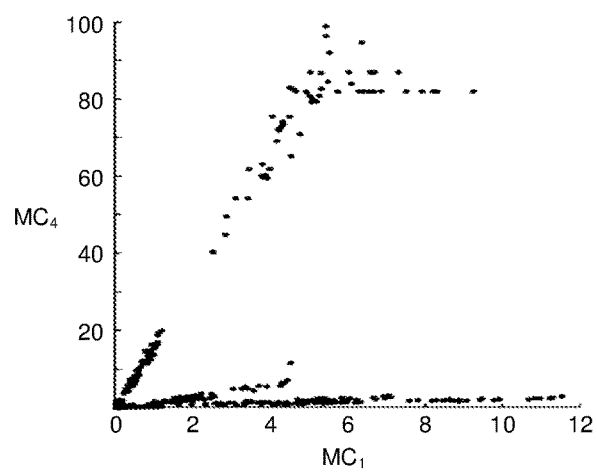

FIGS. 5A-5C illustrate an example of color measurements collected by the measurement collection module 450 in FIG. 4. In this example, color measurements were collected for eight lighting scenarios, each using one of eight light sources 410: a 40 W halogen light, a 45 W incandescent light, a 2700K "warm white" CFL, a 4100K "natural white" fluorescent light, a 6500K "daylight" fluorescent light, a 3000K "warm white" LED, a 5000K "cold white" LED, and a 6500K "daylight" LED. Each of the eight light sources 410 were operated, with only one light source 410 enabled at a time, at four different illuminances: about 500 lux, about 1000 lux, about 5000 lux, and about 7000-10000 lux (with some light sources having a maximum illuminance below 10000 lux). Thus, a total of 32 different ambient lighting conditions were used for collecting color measurements for the eight ambient lighting scenarios. Color measurements were collected from 14 reference sensors 422 for each of the 32 ambient lighting conditions, yielding 448 color measurements. For each color measurement, a four-dimensional color measurement was obtained that included the $MC_1$, $MC_2$, $MC_3$, and $MC_4$ color measurement components described in FIG. 3F. The color measurement components for these color measurements are plotted in FIGS. 5A-5C along various axes: in FIG. 5A, $MC_2$ values are shown in relation to $MC_1$ values; in FIG. 5B, $MC_3$ values are shown in relation to $MC_1$ values; and in FIG. 5C, $MC_4$ values are shown in relation to $MC_1$ values.

Returning to the discussion of FIG. 4, the characterization system 400 includes an ambient lighting clustering module 460 that is configured to automatically analyze the stored color measurements 452 to identify a plurality of clusters of color measurements (which may be referred to as ambient lighting clusters or lighting clusters). Various techniques are known and may be applied for performing automated clustering, including, but not limited to k-means, Gaussian mixture model, k-medoid/PAM clustering, or unsupervised training techniques and algorithms, and variations thereof. In some examples, rather than only selecting from the color measurement components provided by the reference sensors 422 as dimensions for color measurement coordinates used to identify lighting clusters, one or more ratios are calculated using the color measurement component that is the most responsive to the shortest visible wavelengths ($MC_1$ in the examples illustrated in FIGS. 2 and 3F) as the divisor for the ratios, and the one or more ratios are included as dimensions for the color measurement coordinates used to identify lighting clusters. In the examples illustrated in FIGS. 2 and 3F, with four measurement components $MC_1$, $MC_2$, $MC_3$, and $MC_4$, three candidate ratios are available: $MC_2/MC_1$, $MC_3/MC_1$, and $MC_4/MC_1$. In some examples, other arithmetic combinations of the color measurement components may be used as dimensions for color measurement coordinates used to identify lighting clusters. In some examples, a multi-step clustering may be performed, in which a first clustering based on a first set of dimensions identifies first and second lighting clusters for the stored color measurements 452, and a second clustering based on a different second set of dimensions identifies third and fourth lighting clusters for the stored color measurements 452 included in the second cluster. Such multi-step clustering may result in lighting clusters giving more accurate estimated color values over a single-step clustering with additional dimensions. Various techniques are known, and may be applied, to determine an effective number of clusters that does not overfit the stored color measurements 452; for example, silhouette analysis may be used with k-means to evaluate and/or compare clusters produced for selected numbers of clusters. The ambient lighting clustering module 460 is configured to store cluster parameters for the identified lighting clusters, as well as provide the stored cluster parameters 462 in response to requests from other modules and/or systems. As an example, a cluster centroid may be stored as cluster parameters for a cluster identified using k-means clustering. The stored cluster parameters are effective for automatically identifying one of the identified lighting clusters as being associated with a color measurement, such as a new color measurement not originally used to identify the lighting clusters.

In some implementations, each of the ambient lighting scenarios (for example, an ambient lighting scenario in which a single light source 410 is enabled) is associated with a lighting cluster, resulting in each lighting cluster being associated with a lighting cluster of one or more of the ambient lighting scenarios. In some examples, an ambient lighting scenario is associated with the lighting cluster containing the greatest number of stored color measurements 452 for the ambient lighting scenario. In some examples, where the stored color measurements 452 for an ambient lighting scenario are across multiple lighting clusters, a stored color measurement 452 may be removed from a first lighting cluster and/or added to a second lighting cluster (for example, where the second cluster initially contains the greatest number of the stored color measurements 452 for the ambient lighting scenario). In response to a stored color measurement 452 being added to or removed from a lighting cluster, cluster parameters (including stored cluster parameters 462) for the lighting cluster may be accordingly updated; for example, a cluster centroid may be recalculated. The ambient lighting clustering module 460 may be configured to store the determined lighting clusters, as well as provide the stored lighting clusters 464 in response to requests from other modules and/or systems.

Figure 5D:
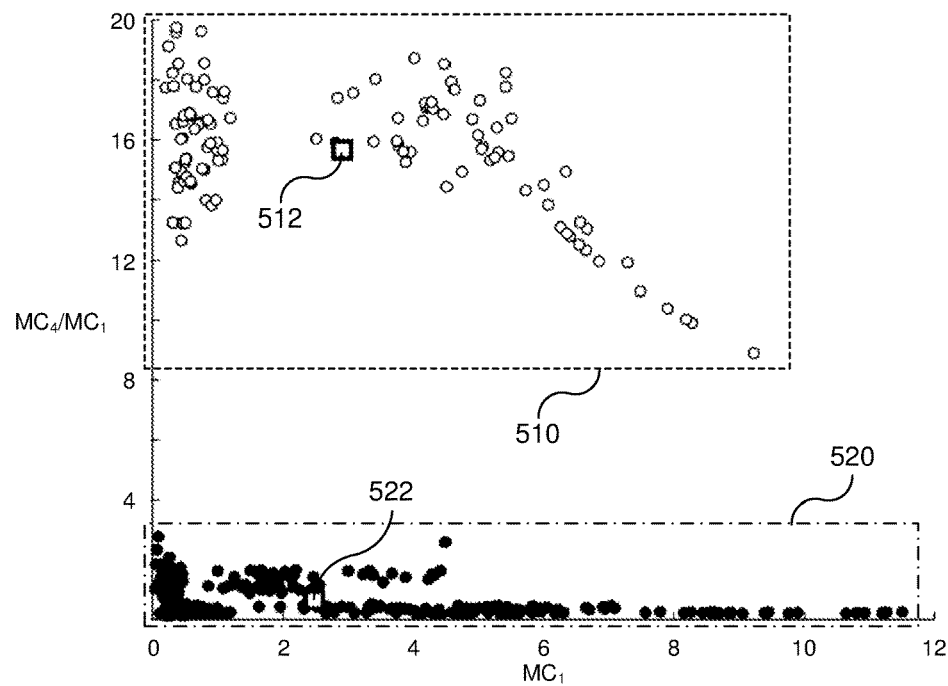
FIGS. 5D and 5E illustrate results of an automated clustering of the color measurements described and illustrated in FIGS. 5A-5C, in accordance with clustering techniques described herein.
Figure 5E:
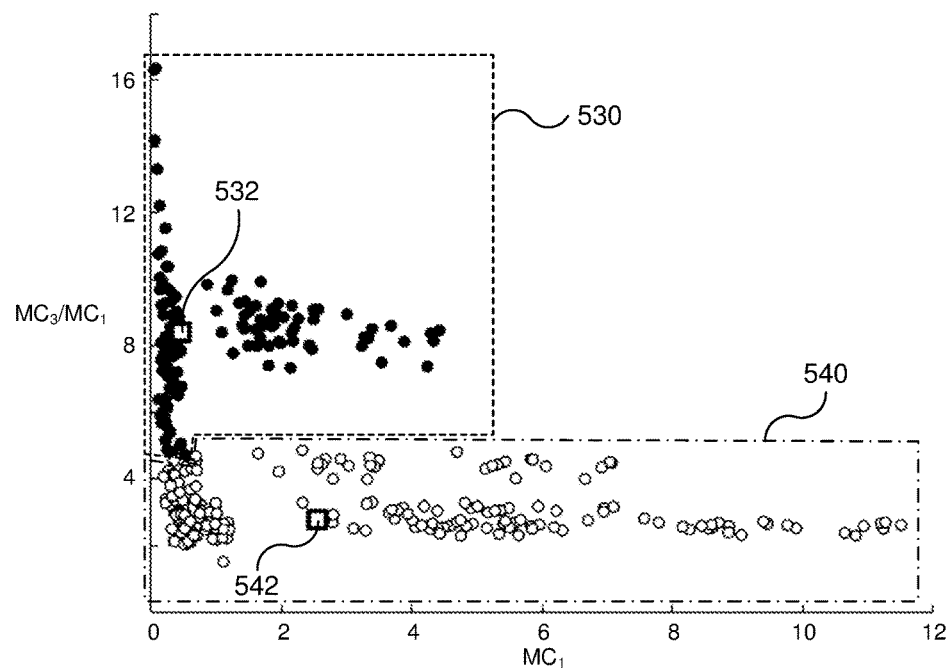

FIGS. 5D and 5E illustrate results of an automated clustering of the color measurements described and illustrated in FIGS. 5A-5C, in accordance with the clustering techniques described above. In FIGS. 5D and 5E, a multi-step clustering, involving first and second automated clustering operations, is performed. FIG. 5D illustrates a result of the first automated clustering where for each color measurement, a ratio of the $MC_4$ and $MC_1$ color measurement components (labeled "$MC_4/MC_1$") and the $MC_1$ color measurement component are used as the dimensions for clustering. In this example, the first automated clustering is performed using a k-means clustering algorithm dividing the measurement data into two lighting clusters: a first lighting cluster 510 with a first cluster centroid 512 and a second lighting cluster 520 with a second cluster centroid 522. FIG. 5E illustrates a result of the second automated clustering where for each color measurement in the second lighting cluster 520 (and not including color measurements in the first lighting cluster 510), a ratio of the $MC_3$ and $MC_1$ color measurement components (labeled "$MC_3/MC_1$") and the $MC_1$ color measurement component are used as the dimensions for clustering. In this example, the second automated clustering was performed using a k-means clustering algorithm whereby the color measurements in the second lighting cluster 520 were divided into two lighting clusters (which may also be referred to as subclusters): a third lighting cluster 530 with a third cluster centroid 532 and a fourth lighting cluster 540 with a fourth cluster centroid 542. The first lighting cluster 510 corresponds to a first lighting cluster (including the 40 W halogen light and the 45 W incandescent light ambient lighting scenarios), the third lighting cluster 530 corresponds to a second lighting cluster (including the "warm white" CFL and the 2700K "warm white" CFL ambient lighting scenarios), and the fourth lighting cluster corresponds to a third lighting cluster (including the "natural white" fluorescent light, the "daylight" fluorescent light, the "cold white" LED, and the "daylight" LED ambient lighting scenarios). Each of the clusters 510, 520, 530, and 540 may be represented by its respective centroid 512, 522, 532, and 542. In this example, the $MC_2$ color measurement component is not used, even for generating a ratio, to identify lighting clusters for color measurements, although the $MC_2$ color measurement component is used to calculate estimated calibrated color values.

Returning to the discussion of FIG. 4, the characterization system 400 includes a lighting cluster transformation generator 470 configured to calculate, for each lighting cluster and/or lighting cluster identified by the ambient lighting clustering module 460, a respective set of generic transformation parameters (which may simply be referred to as "transformation parameters" or "cluster transformation parameters") for a transformation function from color measurement components obtained from an ambient color sensor to a calibrated color value. The transformation parameters are "generic" due to the parameters not accounting for sensor-specific variations in performance. However, the generic transformation parameters are generally effective for providing calibrated color values for the reference sensors 422 and similar ambient color sensors, such as the ambient color sensor 210 in FIG. 2. The lighting cluster transformation generator 470 is be configured to store the per-cluster sets of generic transformation parameters, as well as provide the stored sets of generic transformation parameters 472 in response to requests from other modules and/or systems.

In some implementations, the transformation parameters are coefficients for calculating calibrated color components as linear combinations of the color measurement components. For such a transformation, the four measurement components $MC_1$, $MC_2$, $MC_3$, and $MC_4$ of a color measurement may be arranged in a column as a 4×1 matrix M, the transformation parameters arranged in a 3×4 generic parameter matrix $P_{cluster}$, and the matrices M and $P_{cluster}$ multiplied to yield the calibrated color value (for example, as CIE 1931 XYZ tristimulus values) in a column as a 3×1 matrix $C_{calib}$, according to equation 1.

$$C_{calib} = P_{cluster} \cdot M \quad (1)$$

Various approaches may be used to calculate the generic parameter matrix $P_{cluster}$ for a lighting cluster. In a first approach, for each ambient lighting scenario associated with the assigned lighting cluster, a corresponding lighting scenario parameter matrix $P_{scenario}$, having the same dimensions as the above parameter matrix $P_{cluster}$ (3×4, in this example) is calculated, which can be applied in the same manner as the parameter matrix $P_{cluster}$ to produce calibrated color values from color measurement component values. The lighting scenario parameter matrix $P_{scenario}$ may be calculated according to equation 2.

$$P_{scenario} = C_{ref} \cdot M_{scenario}^{+} \quad (2)$$

$C_{ref}$ is a 3×k matrix, where k is the number of stored color measurements 752 for the ambient lighting scenario and each column of $C_{ref}$ contains a set of tristimulus values provided by the reference spectrometer 430 for the ambient lighting conditions used for a respective one of the k stored color measurements 762 for the ambient lighting scenario. $M_{scenario}^{+}$ is a k×4 pseudoinverse matrix (for example, a Moore-Penrose pseudoinverse), or a similar matrix, of a 4×k matrix $M_{scenario}$, in which each column of $M_{scenario}$ contains a set of four color measurement components $MC_1$, $MC_2$, $MC_3$, and $MC_4$ for a respective one of the k stored color measurements 752 for the ambient lighting scenario. The pseudoinverse provides the best linear approximation, in terms of least squares error, to the actual solution. In some examples, the generation of $M_{scenario}$, $M_{scenario}^{+}$, and/or $P_{scenario}$ may apply weightings to various color measurements to better reflect their expected importance. In some implementations, k is instead the number of stored color measurements 452 for the ambient lighting scenario at a reference illuminance used for all of the ambient lighting scenarios (for example, 5000 lux), and the columns of $C_{ref}$ and $M_{scenario}$ correspond to those stored color measurements 452. The lighting cluster transformation generator 470 may be configured to store the lighting scenario parameter matrix $P_{scenario}$ calculated for each of ambient lighting scenario. Where the lighting cluster has only one ambient lighting scenario in its associated lighting cluster, the generic parameter matrix $P_{cluster}$ for the lighting cluster is simply the lighting scenario parameter matrix $P_{scenario}$. Where the lighting cluster has two or more ambient lighting scenarios in its associated lighting cluster, the generic parameter matrix $P_{cluster}$ for the lighting cluster may be calculated by a mathematic combination of the lighting scenario parameter matrices $P_{scenario}$ calculated for each of the ambient lighting scenarios. For example, each element of the generic parameter matrix $P_{cluster}$ may be calculated by taking the median of the corresponding elements in the lighting scenario parameter matrices $P_{scenario}$. In some examples, the mathematic combination may apply weightings to various ambient lighting scenarios to better reflect their expected importance in end usage situations.

In a second approach, similar operations are performed, but the generic parameter matrix $P_{cluster}$ is calculated more directly according to equation 3.

$$P_{cluster} = C_{ref} \cdot M_{cluster}^{+} \quad (3)$$

$C_{ref}$ is a 3×j matrix, where j is the number of stored color measurements 452 for the lighting cluster and each column of $C_{ref}$ contains a set of tristimulus values provided by the reference spectrometer 430 for the ambient lighting conditions used for a respective one of the j stored color measurements 452 for the lighting cluster. $M_{cluster}^{+}$ is a j×4 pseudoinverse matrix, or a similar matrix, of a 4×j matrix $M_{cluster}$, in which each column of $M_{cluster}$ contains a set of four color measurement components $MC_1$, $MC_2$, $MC_3$, and $MC_4$ for a respective one of the j stored color measurements 452 for the lighting cluster. In some implementations, j is instead the number of stored color measurements 452 for the lighting cluster at a reference illuminance (for example, 5000 lux) used for all of the ambient lighting scenarios associated with the lighting cluster, and the columns of $C_{ref}$ and $M_{cluster}$ correspond to those stored color measurements 452. In some examples, the generation of $M_{cluster}$, $M_{cluster}^{+}$, and/or $P_{cluster}$ may apply weightings to various color measurements to better reflect their expected importance in end usage situations.

It is noted that the transformation function is not limited to the above linear combinations. The transformation function may include one or more of a lookup table (with or without interpolation), an algorithm trained with unsupervised training techniques, and a function that is responsive to one or more past color measurements and/or calibrated color values.

In some implementations, the characterization system 400 is configured to automatically perform an iterative process in which the ambient lighting clustering module 460 automatically identifies a selected number of lighting clusters, the lighting cluster transformation generator 470 calculates a set of generic transformation parameters for each of the identified lighting clusters, the sets of generic transformation parameters are applied to associated stored color measurements 452 to estimate calibrated color values, and an error calculated (for example, a mean squared error) between the estimated calibrated color values and corresponding color values obtained from the reference spectrometer 430. An appropriate number of lighting clusters may be identified by a number of lighting clusters after which a rate of reduction in the error decreases significantly.

FIG. 4 also illustrates an external system 480 that is configured to obtain various measurement-, cluster-, and transformation parameter-related information from characterization system 440 for use by the external system 480. For example, the external system 480 may obtain stored color measurements 452, stored cluster parameters 462, stored lighting clusters 464, and/or stored sets of generic transformation parameters 472 from characterization system 440.

Additional techniques for obtaining calibrated ambient color sensor measurements may be employed. For example, U.S. patent application Ser. No. 15/944,771, filed on Apr. 3, 2018 and entitled "Color Sensing Ambient Light Sensor Calibration," which is incorporated by reference herein in its entirety, describes various techniques for performing per-sensor characterization and correction to address performance variations in ambient color sensors.

Figure 6:
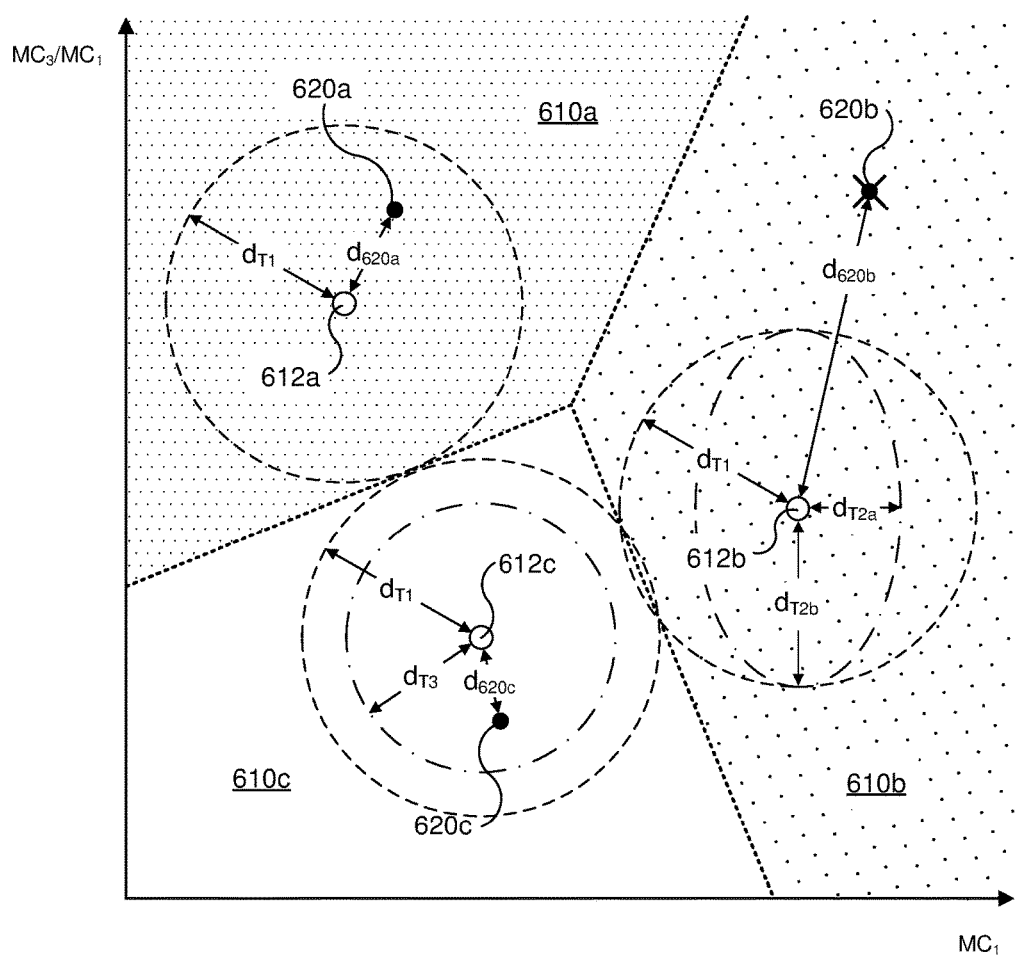
FIG. 6 illustrates examples in which the lighting clusters described in connection with FIGS. 4-5E are used for selecting and weighting colorimetric values obtained for multiple ambient color sensors.

FIG. 6 illustrates examples of selecting and weighting colorimetric values obtained for multiple ambient color sensors based on lighting clusters described in connection with FIGS. 4-5E, which may be applied by the electronic systems and devices described in FIGS. 1A-1I and 2. FIG. 6 presents a simplified example for purposes of discussion and illustration, in which three lighting clusters 610a, 610b, and 610c have been identified with respect to the same two dimensions illustrated in FIG. 5E: a first dimension (in the horizontal direction in FIG. 6) using the $MC_1$ color measurement component, and a second dimension (in the vertical direction in FIG. 6) using a ratio of the $MC_3$ and $MC_1$ color measurement components (labeled "$MC_3/MC_1$"). It is noted that a greater number of dimensions may be used for clustering, different color measurement components may be used, and/or different arithmetic combinations of color measurement components may be used. The clusters 610a, 610b, and 610c may be specified by cluster parameters similar to the stored cluster parameters 462 in FIG. 4. In the example shown in FIG. 6, the lighting clusters 610a, 610b, and 610c were identified using automated k-means clustering. A first cluster centroid 612a is used to identify points included in the first lighting cluster 610a, second cluster centroid 612b is used to identify points included in the second lighting cluster 610b, and a third cluster centroid 612c is used to identify included in the third lighting cluster 610c. Each of the lighting clusters 610a, 610b, and 610c is depicted in FIG. 6 by its corresponding Voronoi cell.

From the color measurement obtained under a given ambient condition, one of the lighting clusters is assigned to the color measurement based on the similarity of the assigned lighting cluster to the color measurement. In the example illustrated in FIG. 6, a similarity between a color measurement and a lighting cluster is calculated using a distance between the color measurement and the cluster centroid for the lighting cluster, with lower distances indicating greater similarity. FIG. 6 depicts three color measurements 620a, 620b, and 620c captured by three different ambient color sensors at approximately a same time at different respective positions. It is noted that different numbers of color measurements may be used; for example, where the electronic device 100 includes only two ambient color sensors, only two color measurements would be used. Due to the first color measurement 620a being closer to the first cluster centroid 612a (at a Euclidean distance $d_{620a}$) than the cluster centroids 612b and 612c, the first lighting cluster 610a is the most similar to, and selected as corresponding to, the first color measurement 620a. Due to the second color measurement 620b being closer to the second cluster centroid 612b (at a Euclidean distance $d_{620b}$) than the cluster centroids 612a and 612c, the second lighting cluster 610b is the most similar to, and selected as corresponding to, the second color measurement 620b. Due to the third color measurement 620c being closer to the third cluster centroid 612c (at a Euclidean distance $d_{620c}$) than the cluster centroids 612a and 612b, the third lighting cluster 610c is the most similar to, and selected as corresponding to, the third color measurement 620c. Other techniques for determining amounts of similarity between color measurements and lighting clusters (for example, where similarity is not determined based on a distance) may be used. For example, with some clustering or modeling techniques, a confidence value may be determined for a color measurement in relation to one or more lighting clusters, which may be used to calculate a similarity of the color measurement to the one or more lighting clusters.

A calculated similarity between a color measurement and its assigned lighting cluster may be used to determine whether the color measurement should be treated as valid or invalid, and/or used to calculate a weight for combining the color measurement in combination with one or more additional color measurements (which may be referred to as "fusion" of the color measurements). A determination whether the color measurement should be treated as valid or invalid is based on whether the calculated similarity is within a threshold similarity. In the example in FIG. 6, where a Euclidean distance is used for similarity, a threshold distance $d_{T1}$ is used to distinguish valid and invalid color measurements. The first color measurement 620a is determined to be valid due to the distance $d_{620a}$ being less than or equal to the threshold distance $d_{T1}$. Likewise, the third color measurement 620c is determined to be valid due to the distance $d_{620c}$ being less than or equal to the threshold distance $d_{T1}$. In contrast, the second color measurement 620b is determined to be invalid due to the distance $d_{620b}$ being greater than the threshold distance $d_{T1}$. In some examples, different threshold similarities may be used among the lighting clusters. For example, a smaller threshold distance $d_{T3}$ may be used for the third lighting cluster 610c instead of the threshold distance $d_{T1}$. In some examples, different threshold similarities may be applied in different dimensions. For example, instead of the instead of the threshold distance $d_{T1}$, a first threshold distance $d_{T2a}$ may be applied in the first dimension ($MC_1$), and a second threshold distance $d_{T2b}$ applied in the second dimension ($MC_3/MC_1$). The color measurements determined to the invalid are then not included in a set of color measurements selected and used for fusion. In the example shown in FIG. 6, although three color measurements 620a, 620b, and 620c were obtained, the second color measurement would not be selected for the set of color measurements used for fusion.

A weight for combining the color measurement in combination with one or more additional color measurements may be calculated based on the calculated similarity between the color measurement and its assigned lighting cluster, with increased weighting for increased similarity. For example, the color measurements 620a, 620b, and 620c may be weighted as follows:

$$\text{weight for first color measurement } 620a : \frac{d_{620c}}{d_{620a}}$$

-continued weight for second color measurement 620b : $\frac{d_{620c}}{d_{620b}}$ weight for third color measurement 620c : $\frac{d_{620c}}{d_{620c}}$ As another example, to further emphasize color measurements with greater calculated similarities, a weight calculation may be a nonlinear, such as:

weight for first color measurement 620a : $\left(\frac{d_{620c}}{d_{620a}}\right)^2$ weight for second color measurement 620b : $\left(\frac{d_{620c}}{d_{620b}}\right)^2$ weight for third color measurement 620c : $\left(\frac{d_{620c}}{d_{620c}}\right)^2$ For each color measurement, one or more additional weights may be calculated, which are combined with a weight calculated based on a similarity of the color measurement to its assigned lighting cluster (for example, by calculating an arithmetic product of the multiple weights). Further use of weights for the color measurements are discussed below.

Figure 7:
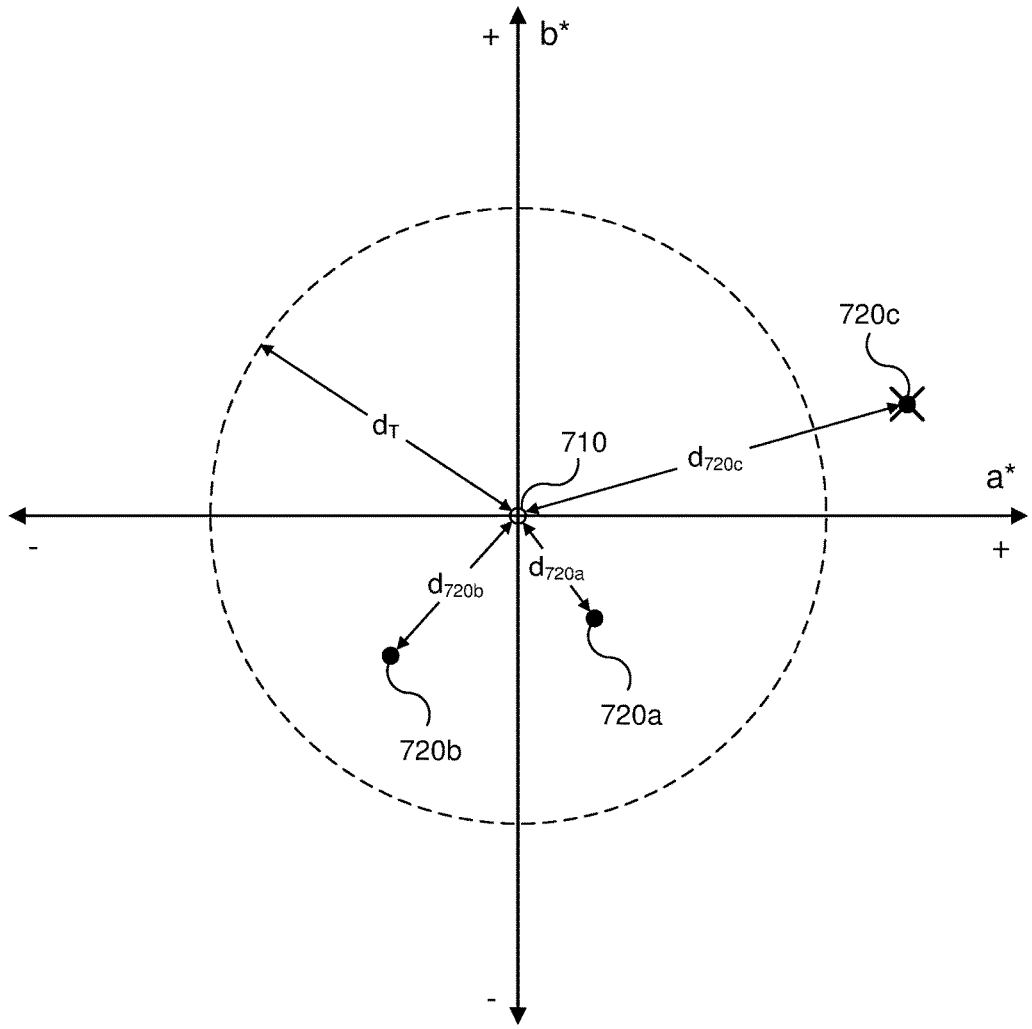
FIG. 7 illustrates examples of selecting and weighting colorimetric values obtained for multiple ambient color sensors based on perceptual color space coordinates corresponding to the colorimetric values.

FIG. 7 illustrates examples of selecting and weighting colorimetric values obtained for multiple ambient color sensors based on perceptual color space coordinates corresponding to the colorimetric values, which may be applied by the electronic systems and devices described in FIGS. 1A-1I and 2. In FIG. 7, perceptual color space coordinates are calculated for color measurements. In the particular example illustrated in FIG. 7, the CIE-L*a*b* 1976 color space is used, with the a* and b* components depicted in FIG. 7. The two-dimensional coordinates illustrated in FIG. 7, which do not depict the L* lightness component, may be referred to as a*b* coordinates, and the two-dimensional space illustrated in FIG. 7 may be referred to as a*b* perceptual color space. The L* perceptual color space coordinate component may be discarded, ignored, and/or not calculated, as chromaticity is of more interest and utility for the techniques described in connection with FIG. 7. It is noted that other perceptual color spaces may be used to similar effect, such as, but not limited to, the CIE-L*u*v*, CIE-UVW, CIECAM02, CIE-LCh$_{ab}$, and CIE-LCh$_{uv}$ color spaces.

For each color measurement, multiple perceptual color space coordinates are calculated by transforming the color measurement relative to multiple reference white points. For example, a CIEXYZ tristimulus coordinate (X, Y, Z) for a color measurement for an ambient color sensor may be transformed to an a*b* coordinate (a*, b*) relative to a CIEXYZ tristimulus coordinate $(X_n, Y_n, Z_n)$ for a reference white point as follows:

$$a^* = 500\left(f\left(\frac{X}{X_n}\right) - f\left(\frac{Y}{Y_n}\right)\right) \text{ and } b^* = 200\left(f\left(\frac{Y}{Y_n}\right) - f\left(\frac{Z}{Z_n}\right)\right)$$

where $$f(t) = \begin{cases} \sqrt[3]{t} & \text{if } t > \delta^3 \\ \frac{t}{\delta^2} + \frac{4}{29} & \text{otherwise} \end{cases} \text{ and } \delta = \frac{6}{29}$$

The colorimetric value being transformed, such as the above CIEXYZ tristimulus coordinate (X, Y, Z) above, may be obtained by calculating a calibrated and/or corrected colorimetric value from a color measurement performed and provided by an ambient color sensor. For example, with reference to FIGS. 4-6, an assigned lighting cluster may be selected for a color measurement (for example, a color measurement with $MC_1$, $MC_2$, $MC_3$, and $MC_4$ components as discussed above), and transformation parameters corresponding to the selected lighting cluster applied to convert the color measurement into a calibrated and/or corrected CIEXYZ colorimetric value. Each of the reference white points is for a different one of multiple reference light sources. For example, a reference white point may be provided for each of the eight light sources 410 discussed above in connection with FIGS. 5A-5C.

For each calculated perceptual color space coordinate, a distance is calculated based on one or more components of the perceptual color space coordinate. For example, the distance may be calculated to a selected perceptual color space coordinate 710, such as the origin (a*=0, b*=0, to which a distance is $$\sqrt[2]{a^{*2} + b^{*2}}).$$

In some examples, some, but not all, perceptual color space coordinate components are used; for example, in the CIE-LCh$_{ab}$ color space the C* component is equivalent to the a*b* distance to the a*b* origin. The smallest of the distances calculated for the perceptual color space coordinates for a color measurement for an ambient color sensor is selected as a minimum distance for the color measurement. FIG. 7 illustrates an example involving three color measurements captured by three different ambient color sensors at approximately a same time at different respective positions. It is noted that different numbers of color measurements may be used. FIG. 7 shows a first perceptual color space coordinate 720a for a first color measurement for a first ambient color sensor with a first minimum distance $d_{720a}$ among multiple perceptual color space coordinates calculated as discussed above, a second perceptual color space coordinate 720b for a second color measurement for a second ambient color sensor with a second minimum distance $d_{720b}$, and a third perceptual color space coordinate 720c for a third color measurement for a third ambient color sensor with a third minimum distance $d_{720c}$. The minimum distances $d_{720a}$, $d_{720b}$, and $d_{720c}$ each indicate a perceptual color similarity of the corresponding color measurement to the reference light sources (specifically, to the reference light source resulting in the smallest perceptual color space distance).

A minimum distance calculated for a color measurement, as discussed above, may be used to determine whether the color measurement should be treated as valid or invalid, and/or used to calculate a weight for combining the color measurement in combination with one or more additional color measurements. A determination whether the color measurement should be treated as valid or invalid is based on whether its minimum distance is within a threshold distance. In FIG. 7, a threshold distance $d_T$ is used to distinguish valid and invalid color measurements. The first color measurement, for coordinate 720a, is determined to be valid due to the minimum distance $d_{720a}$ being less than or equal to the threshold distance $d_T$. Likewise, the second color measurement, for coordinate 720b, is determined to be valid due to the minimum distance $d_{720b}$ being less than or equal to the threshold distance $d_T$. In contrast, the third color measurement, for coordinate 720c, is determined to be invalid due to the minimum distance $d_{720c}$ being greater than the threshold distance $d_T$. The color measurements determined to the invalid are then not included in a set of color measurements selected and used for fusion. In the example shown in FIG. 7, although three color measurements were obtained, the third color measurement corresponding to coordinate 720c would not be selected for the set of color measurements used for fusion.

A weight for combining the color measurement in combination with one or more additional color measurements may be calculated based on the minimum distance calculated for the color measurement, with an inverse relationship between the minimum distance and the weight. For example, the three color measurements for FIG. 7 may be weighted as follows:

$$\text{weight for first color measurement: } \frac{d_{720a}}{d_{720a}}$$

$$\text{weight for second color measurement: } \frac{d_{720a}}{d_{720b}}$$

$$\text{weight for third color measurement: } \frac{d_{720a}}{d_{720c}}$$

To further emphasize color measurements with smaller minimum distances, a weight calculation may be a nonlinear, as previously illustrated in connection with FIG. 6. For each color measurement, one or more additional weights may be calculated (for example, the weights described for FIG. 6), which are combined with a weight calculated based on a minimum distance calculated for the color measurement (for example, by calculating an arithmetic product of the multiple weights). Further use of weights for the color measurements are discussed below.

In various implementations, one or more of the following four techniques described for FIGS. 6 and 7 may be combined and performed in any order:
- determining whether a color measurement is valid or invalid based on a calculated similarity between the color measurement and its assigned lighting cluster,
- calculating a weight for a color measurement for combination with other color measurements based on a calculated similarity between the color measurement and its assigned lighting cluster,
- determining whether a color measurement is valid or invalid based on perceptual color space distances for multiple reference light sources, and/or
- calculating a weight for a color measurement for combination with other color measurements based on perceptual color space distances for multiple reference light sources.

Also, once a color measurement has been determined to be invalid by the techniques described for FIGS. 6 and 7, the color measurement may be excluded from further processing that is applied to valid (or not invalid) color measurements. For example, a weight may not be calculated for a color measurement that has been determined to be invalid. Also, weights determined for multiple color measurements (or multiple valid color measurements) may be normalized, such as dividing the individual weights by the arithmetic sum of the weights.

Figure 8:
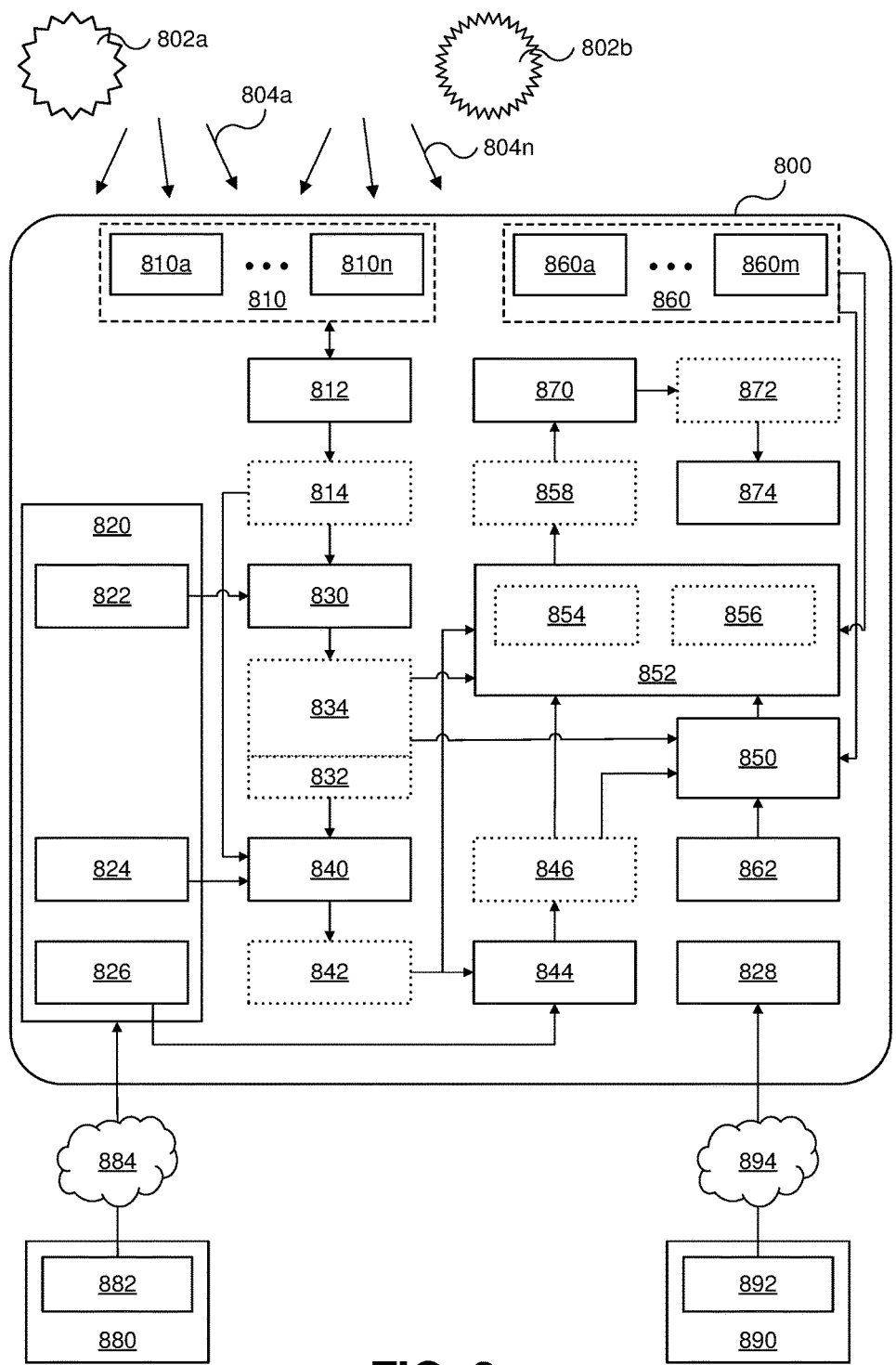
FIG. 8 illustrates an example of an electronic system 800 that is configured to process colorimetric values obtained for multiple ambient color sensors to obtain a single colorimetric value.

FIG. 8 illustrates an example of an electronic system 800 that is configured to process colorimetric values obtained for multiple ambient color sensors to obtain a single colorimetric value. The electronic system 800 may include any of the features described in FIGS. 1A-7, and may be embodied in a single device, such as the electronic device 100 in FIGS. 1A-1G. The electronic system 800 includes multiple ambient color sensors 810a-810n, collectively referred to as ambient color sensors 810. Where the lighting clusters described in FIGS. 4-5E are used to calculate calibrated colorimetric values, some or all of the ambient color sensor 810 are substantially the same as the reference sensors 422 in FIG. 4. The electronic system 800 also includes at least one sensor control module 812 that is configured to control the ambient color sensors 810 (including, for example, setting operating parameters and/or initiating measurement operations), and provide respective color measurements 814 for approximately a same time for respective ambient lighting 804a-804n (which may be produced, for example, by light source 802a and/or light source 802b) to one or more other modules included in the electronic system 800, such as a lighting cluster selection module 830 (although in some implementations, lighting clusters may not be used).

The electronic system 800 stores color sensor calibration data 820, which includes lighting cluster parameters 822 (such as the stored lighting cluster parameters 462 in FIG. 4), sets of cluster transformation parameters 824 (such as the stored sets of generic transformation parameters 472 in FIG. 4), and/or reference white point values 826 (as discussed in association with FIG. 7). In some implementations, the electronic system 800 is configured to receive updates for the color sensor calibration data 820 from a calibration data delivery system 880 via a network 884, such as the Internet. The calibration data delivery system 880 is configured to respond to requests for color sensor calibration data and respond with items of color sensor calibration data obtained from a calibration data storage 882. In addition to obtaining updated sensor calibration data, the electronic system 800 may also be configured to make use of the calibration data delivery system 880 to restore the color sensor calibration data 820 in an event in which the color sensor calibration data 820 is corrupted. In some examples, updates for the color sensor calibration data 820 may instead be delivered as part of a software update including assets for other software features; for example, such software updates may be received from an operating code delivery system 890 configured to provide updates to operational program instructions 828 for the electronic system 800. The operational program instructions 828 which, when executed by the electronic system 800, cause the electronic system 800 to configure the electronic system 800 to implement the various modules 812, 830, 840, 844, 850, 852, 870, and 874.

The lighting cluster selection module 830 is configured to receive, via the sensor control module 812, the color measurements 814 produced by the ambient color sensors 810. For each of the color measurements 814, the lighting cluster selection module 830 selects, based on the lighting cluster parameters 822, a corresponding assigned lighting cluster 832 (for example, the lighting cluster most similar to the color measurement 814) and calculates a similarity 834 between the color measurement 814 and its assigned lighting cluster 832, much as discussed in FIG. 6. The electronic system 800 includes a cluster transformation module 840, which is configured to, for each of the color measurements 814, obtain a set of the cluster transformation parameters 824 corresponding to the assigned lighting cluster 832 selected for the color measurement 814 by the lighting cluster selection module 830 to the color measurement 814 to produce a corresponding calibrated colorimetric value 842 (which may be in the form of CIE 1931 XYZ tristimulus values, for example). As an example, where a matrix-based approach for such calculations is employed, as described in FIG. 4, a calibrated tristimulus colorimetric value $C_{cal}$ is calculated (arranged as a 3×1 matrix) according to equation 4:

$$C_{cal} = P_{cluster} \cdot C_{corr} \quad (4)$$

$P_{cluster}$ is the 3×4 matrix generic parameter matrix described in FIG. 4 for the selected assigned lighting cluster 832, and $C_{corr}$ is a color measurement 814 (arranged as a 4×1 matrix containing the color measurement components $MC_1$, $MC_2$, $MC_3$, and $MC_4$).

The electronic system 800 includes a perceptual color space analysis module 844, which is configured to, for calibrated colorimetric values 842 produced by the cluster transformation module 840, calculate multiple perceptual color space coordinates and respective perceptual color space distances for each calibrated colorimetric value 842 using the stored reference white point values 826, and select the smallest of the perceptual color space distances as a minimum distance 846 for the calibrated colorimetric value 842, in accordance with the techniques described in FIG. 7.

The electronic system 800 includes a color sensor/measurement selection module 850, which is configured to determine which of the color measurements 814 are considered valid or invalid, and as a result selecting a set of the color measurements 814 for use in generating a final colorimetric value 872. A determination whether a color measurement 814 is valid or invalid may be based, at least in part, on a calculated similarity 834 between the color measurement 814 and its assigned lighting cluster 832, as described in FIG. 6. A determination whether a color measurement 814 is valid or invalid may be based, at least in part, on the minimum perceptual color space distances 846 calculated by the perceptual color space analysis module 844, as described in FIG. 7. In some implementations including one or more proximity sensors 860a-860m (collectively referred to as proximity sensors 860), a determination whether a color measurement 814 is valid or invalid is based, at least in part, on proximity measurements obtained from the proximity sensors 860. For example, a color measurement 814 may be determined to be invalid in response to a proximity sensor 860 associated with (for example, proximate to) an ambient color sensor 810 for the color measurement 814 indicating an object in close proximity that is likely to interfere with receiving ambient light 804. In some implementations, the electronic system 800 includes one or more physical configuration sensors 862 and a determination whether a color measurement 814 is valid or invalid is based, at least in part, indications of a current physical arrangement of one or more portions of the electronic system 800 provided by the physical configuration sensors 862. Examples of the physical configuration sensors 862 include, but are not limited to, the angular sensors described in FIGS. 1A-1H. By way of example with reference to the electronic device 102 in FIG. 1H, where an angular sensor indicates that the angle $\theta_B$ is less than or equal to a threshold angle, such as the threshold angle $\theta_T$ in FIG. 1C, color measurements 814 for ambient color sensors 810 corresponding to the second and third openings 142b and 142c may be determined to be invalid due to likely interference by second and third panels 123b and 123c (for example, due to images displayed by panels 123b and/or 123c, and/or blocking of ambient light 804 by panels 123b and/or 123c).

Where only one of the color measurements 814 is determined to be valid (or not invalid), the electronic system 800 responds by using the corresponding calibrated colorimetric value 842 as the final colorimetric value 872, allowing the electronic system 800 to avoid further processing related to the current color measurements 814 such as calculating weights for the color measurements 814. Where two or more of the color measurements 814 are determined to be valid (or not invalid), the electronic system 800 responds by calculating the final colorimetric value 872 as a single colorimetric value based on the two or more calibrated colorimetric values 842 corresponding to the valid color measurements 814.

The electronic system 800 includes a weight calculation module 852, which is configured to calculate weights 858 for combining two or more of the calibrated color values 842 to calculate a single final colorimetric value 872 based on two or more color measurements 814. The weight calculation module 852 may be configured to calculate a cluster based weight 854 for a color measurement 814 based on a calculated similarity 834 between the color measurement 814 and its assigned lighting cluster 832, as described in FIG. 6. The weight calculation module 852 may be configured to calculate a perceptual color space distance based weight 856 for a color measurement 814 based on the minimum perceptual color space distances 846 calculated by the perceptual color space analysis module 844, as described in FIG. 7. In some implementations including the proximity sensors 860, weight for a color measurement 814 is calculated based, at least in part, on proximity measurements obtained from the proximity sensors 860. For example, in response to a proximity sensor 860 detecting a likely presence of a user, a corresponding color measurement 814 may receive an increased weight in view of the presence of the user. Where multiple weights are calculated for a color measurement 814 (for example, a cluster based weight 854 and a perceptual color space distance based weight 856), a single weight 858 is calculated from the multiple weights, such as by calculating an arithmetic product of the multiple weights. Weights determined for multiple color measurements (or multiple valid color measurements) may be normalized, such as dividing the individual weights by the arithmetic sum of the weights; this may be applied to weights 854, 856, and/or 858.

The electronic system 800 includes a color measurement fusion module 870, which is configured to calculate a single final colorimetric value 872 from two or more calibrated colorimetric values 842 for a corresponding two or more current color measurements 814. In some implementations, the calculation is based on the weights 858 produced by the weight calculation module 852. Where the weights 858 are used, each component of final colorimetric value 872 is an arithmetic sum of the products of each valid calibrated colorimetric value 842 with its respective weight 858, which may be implemented as a sequence of multiply-accumulate operations. The electronic system 800 includes a color processing module 874, which is configured to receive and make use of the final colorimetric value 872; for example, by adjusting a color cast for an image presented on a display device according to the final colorimetric value 872.

It is noted that the above description of the electronic system 800 is merely for illustration and to facilitate understanding of the disclosed subject matter, and that implementations of the electronic system 800 are not limited to the orders of operations described above. For example, operations related to similarities 834 of color measurements 814 to their assigned lighting clusters 832 described for color sensor/measurement selection module 850 and/or weight calculation module 852 may be performed along with the operations performed by the lighting cluster selection module 830. The modules 812, 830, 840, 844, 850, 852, 870, and 874 may be combined and/or divided. In some implementations, the electronic system 800 is not configured to perform one or more of the following:

determining whether a color measurement is valid or invalid based on a calculated similarity between the color measurement and its assigned lighting cluster,
  calculating a weight for a color measurement for combination with other color measurements based on a calculated similarity between the color measurement and its assigned lighting cluster,
  determining whether a color measurement is valid or invalid based on perceptual color space distances for multiple reference light sources, and/or
  calculating a weight for a color measurement for combination with other color measurements based on perceptual color space distances for multiple reference light sources.

In such implementations, corresponding operations and/or modules described in FIG. 8 may be omitted and/or replaced.

Figure 9:
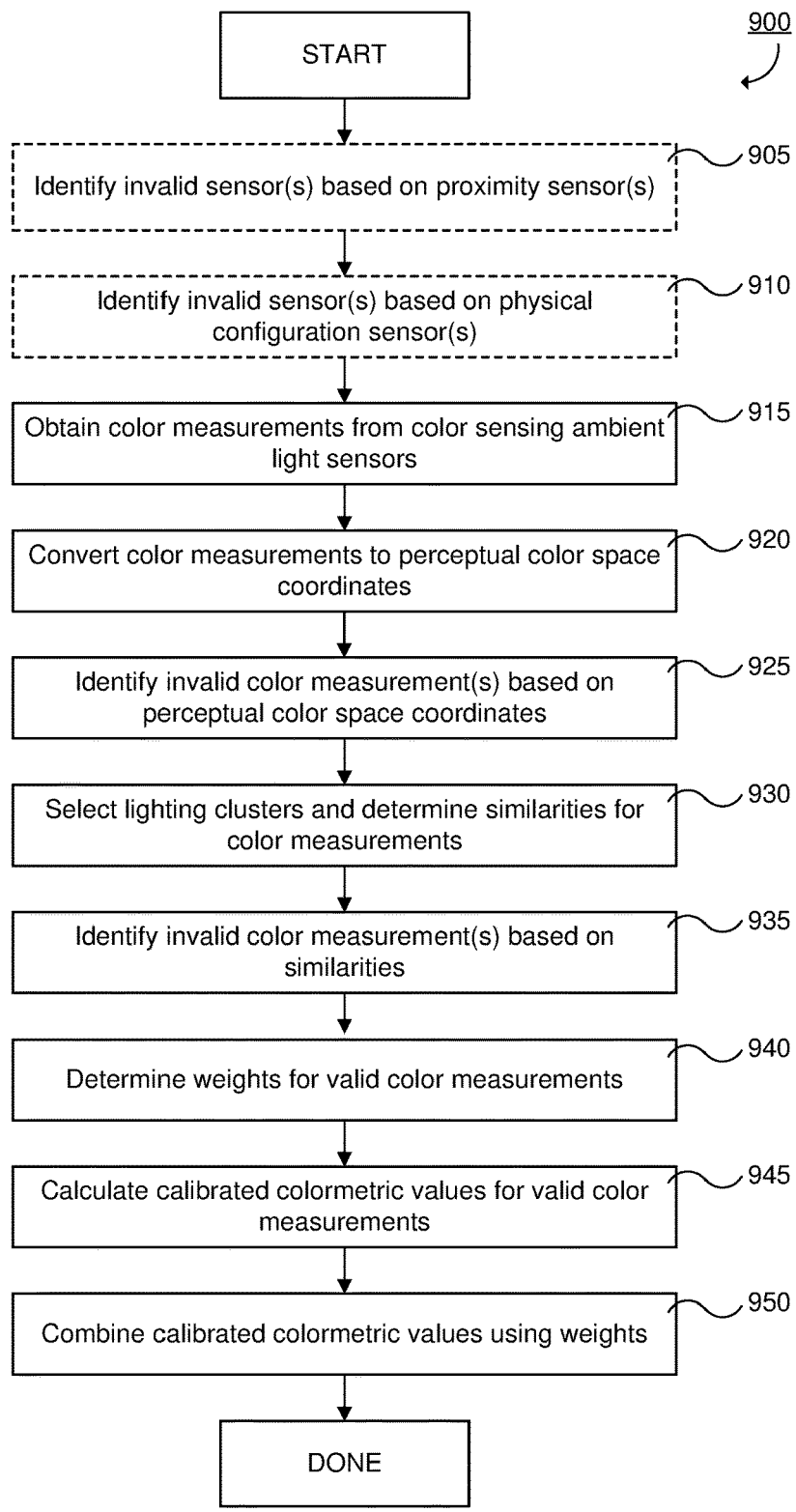
FIG. 9 illustrates an example process for generating a single colorimetric value from color measurements for multiple ambient color sensors with the electronic system in FIG. 8.

FIG. 9 illustrates an example process for generating a single colorimetric value from color measurements for multiple ambient color sensors with the electronic system 800 in FIG. 8, applying the various techniques described above. It is noted that other processes, or variations of the process 900, may instead be applied, including omission and/or rearrangement of the operations illustrated in FIG. 9. At 905, the electronic system 800 identifies invalid sensors, if any, based on information obtained by proximity sensors, as discussed in connection with the color sensor/measurement selection module 850. At 910, the electronic system 800 identifies invalid sensors, if any, based on information received from one or more physical configuration sensors, as discussed in connection with the color sensor/measurement selection module 850. At 915, the electronic system 800 obtains color measurements at approximately a same time from multiple ambient color sensors at different positions, as discussed in connection with the sensor control module 812. In some implementations, any ambient color sensors identified as invalid at 905 or 910 may be disabled and/or not used to obtain color measurements. At 920, the electronic system 800 converts the color measurements obtained at 915 to corresponding perceptual color space coordinates, as described for the perceptual color space analysis module 844. At 925, the electronic system 800 identifies invalid color measurements, if any, based on the perceptual color space coordinates obtained at 920, as discussed in connection with the color sensor/measurement selection module 850. At 930, the electronic system 800 selects lighting clusters for the color measurements and determines similarities between the color measurements and the selected lighting clusters, as described for the cluster selection module 830. At 935, the electronic system 800 identifies invalid color measurements, if any, based on the similarities determined at 930, as discussed in connection with the color sensor/measurement selection module 850. At 940, the electronic system 800, determines weights for valid color measurements, as described in connection with the weight calculation module 852. At 945, the electronic system 800 calculates calibrated colorimetric values for the valid color measurements, as discussed in connection with the cluster transformation module 840. At 950, the electronic device 800 combines the calibrated colorimetric values produced at 945 using the weights produced at 940 to produce a single final colorimetric value, as described above.

The examples of systems and modules for processing color measurements obtained for multiple ambient color sensors, according to the disclosure, are presented herein for illustration of the disclosure and its benefits. Such examples of use should not be construed to be limitations on the logical process embodiments of the disclosure, nor should variations of user interface methods from those described herein be considered outside the scope of the present disclosure. Certain embodiments are described herein as including modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 10:
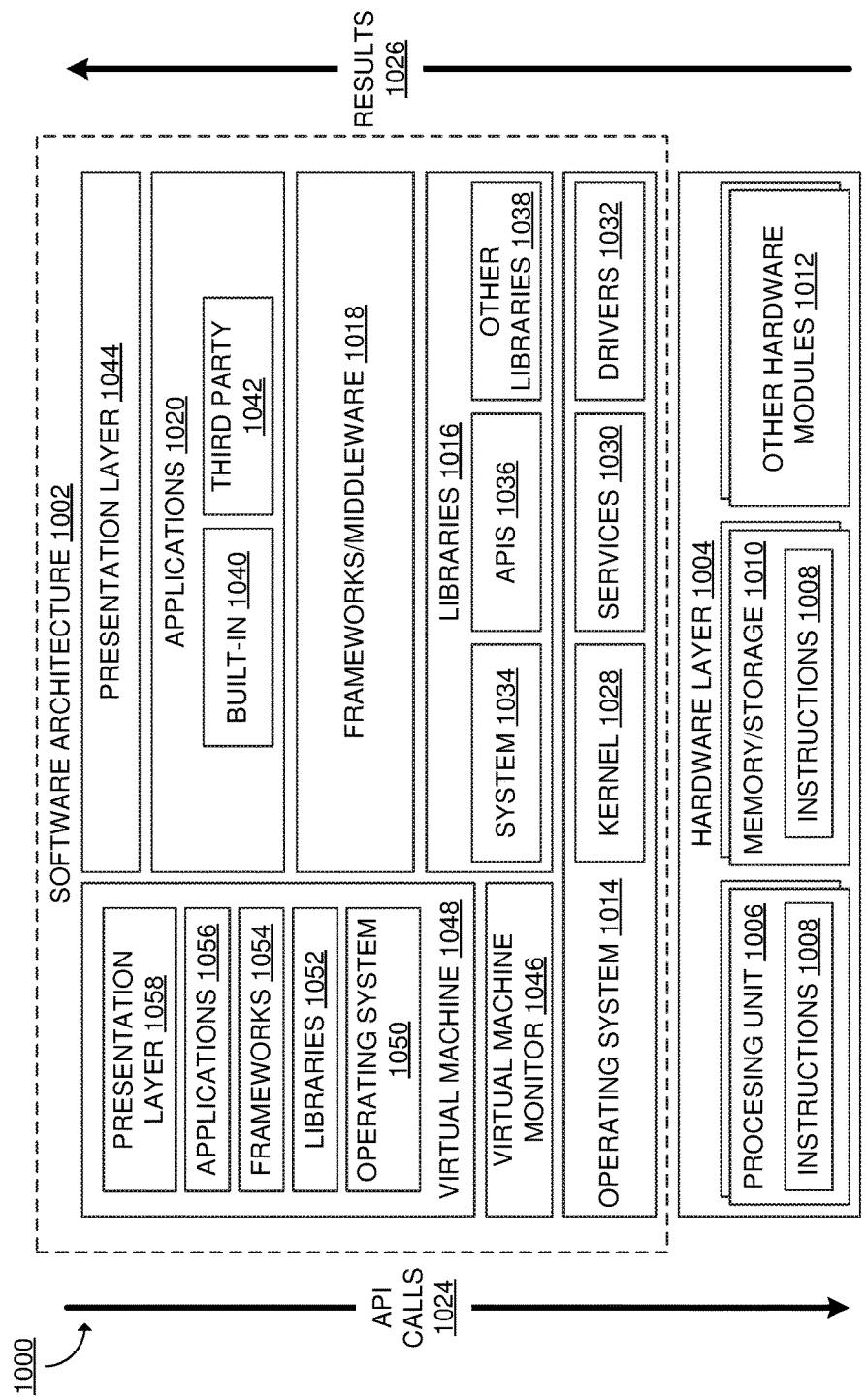
FIG. 10 is a block diagram illustrating an example software architecture, various portions of which may be used in conjunction with various hardware architectures herein described.

FIG. 10 is a block diagram 1000 illustrating an example software architecture 1002, various portions of which may be used in conjunction with various hardware architectures herein described, which may implement any of the above-described features. FIG. 10 is a non-limiting example of a software architecture and it will be appreciated that many other architectures may be implemented to facilitate the functionality described herein. The software architecture 1002 may execute on hardware such as a machine 1100 of FIG. 11 that includes, among other things, processors 1110, memory 1130, and input/output (I/O) components 1150. A representative hardware layer 1004 is illustrated and can represent, for example, the machine 1100 of FIG. 11. The representative hardware layer 1004 includes a processing unit 1006 and associated executable instructions 1008. The executable instructions 1008 represent executable instructions of the software architecture 1002, including implementation of the methods, modules and so forth described herein. The hardware layer 1004 also includes a memory/storage 1010, which also includes the executable instructions 1008 and accompanying data. The hardware layer 1004 may also include other hardware modules 1011. Instructions 1008 held by processing unit 1008 may be portions of instructions 1008 held by the memory/storage 1010.

The example software architecture 1002 may be conceptualized as layers, each providing various functionality. For example, the software architecture 1002 may include layers and components such as an operating system (OS) 1014, libraries 1016, frameworks 1018, applications 1020, and a presentation layer 1044. Operationally, the applications 1020 and/or other components within the layers may invoke API calls 1024 to other layers and receive corresponding results 1026. The layers illustrated are representative in nature and other software architectures may include additional or different layers. For example, some mobile or special purpose operating systems may not provide the frameworks/middleware 1018.

The OS 1014 may manage hardware resources and provide common services. The OS 1014 may include, for example, a kernel 1028, services 1030, and drivers 1032. The kernel 1028 may act as an abstraction layer between the hardware layer 1004 and other software layers. For example, the kernel 1028 may be responsible for memory management, processor management (for example, scheduling), component management, networking, security settings, and so on. The services 1030 may provide other common services for the other software layers. The drivers 1032 may be responsible for controlling or interfacing with the underlying hardware layer 1004. For instance, the drivers 1032 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1016 may provide a common infrastructure that may be used by the applications 1020 and/or other components and/or layers. The libraries 1016 typically provide functionality for use by other software modules to perform tasks, rather than interacting directly with the OS 1014. The libraries 1016 may include system libraries 1034 (for example, C standard library) that may provide functions such as memory allocation, string manipulation, file operations. In addition, the libraries 1016 may include API libraries 1036 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1016 may also include a wide variety of other libraries 1038 to provide many functions for applications 1020 and other software modules.

The frameworks 1018 (also sometimes referred to as middleware) provide a higher-level common infrastructure that may be used by the applications 1020 and/or other software modules. For example, the frameworks 1018 may provide various graphic user interface (GUI) functions, high-level resource management, or high-level location services. The frameworks 1018 may provide a broad spectrum of other APIs for applications 1020 and/or other software modules.

The applications 1020 include built-in applications 1040 and/or third-party applications 1042. Examples of built-in applications 1040 may include, but are not limited to, a contacts application, a browser application, a location application, a media application, a messaging application, and/or a game application. Third-party applications 1042 may include any applications developed by an entity other than the vendor of the particular platform. The applications 1020 may use functions available via OS 1014, libraries 1016, frameworks 1018, and presentation layer 1044 to create user interfaces to interact with users.

Some software architectures use virtual machines, as illustrated by a virtual machine 1048. The virtual machine 1048 provides an execution environment where applications/modules can execute as if they were executing on a hardware machine (such as the machine 1100 of FIG. 11, for example). The virtual machine 1048 may be hosted by a host OS (for example, OS 1014) or hypervisor, and may have a virtual machine monitor 1046 which manages operation of the virtual machine 1048 and interoperation with the host operating system. A software architecture, which may be different from software architecture 1002 outside of the virtual machine, executes within the virtual machine 1048 such as an OS 1020, libraries 1022, frameworks 1024, applications 1026, and/or a presentation layer 1028.

Figure 11:
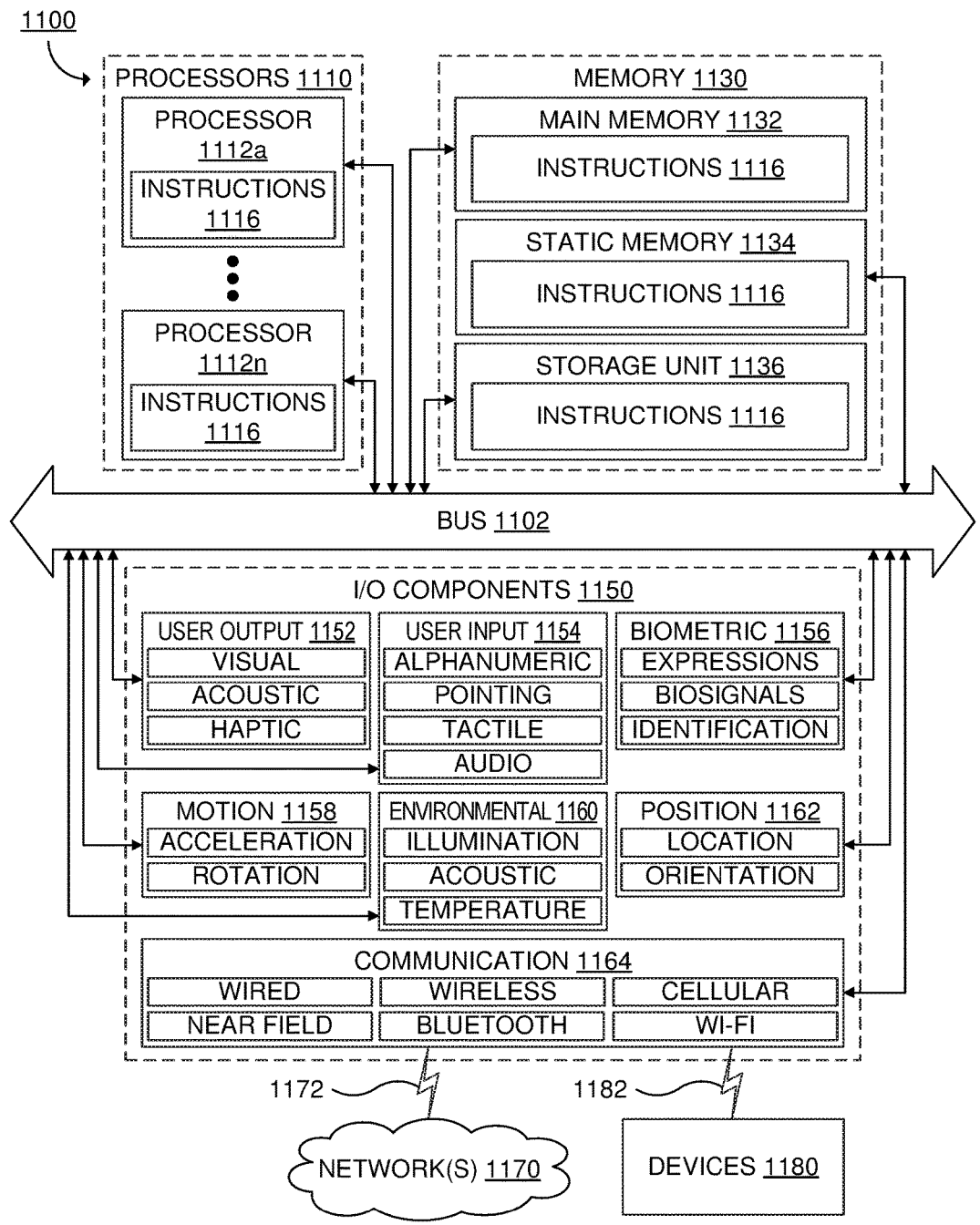
FIG. 11 is a block diagram illustrating components of an example machine configured to read instructions from a machine-readable medium.

FIG. 11 is a block diagram illustrating components of an example machine 1100 configured to read instructions from a machine-readable medium (for example, a machine-readable storage medium) and perform any of the features described herein. The example machine 1100 is in a form of a computer system, within which instructions 1116 (for example, in the form of software components) for causing the machine 1100 to perform any of the features described herein may be executed. As such, the instructions 1116 may be used to implement modules or components described herein. The instructions 1116 cause unprogrammed and/or unconfigured machine 1100 to operate as a particular machine configured to carry out the described features. The machine 1100 may be configured to operate as a standalone device or may be coupled (for example, networked) to other machines. In a networked deployment, the machine 1100 may operate in the capacity of a server machine or a client machine in a server-client network environment, or as a node in a peer-to-peer or distributed network environment. Machine 1100 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1100 is illustrated, the term "machine" include a collection of machines that individually or jointly execute the instructions 1116.

The machine 1100 may include processors 1110, memory 1130, and I/O components 1150, which may be communicatively coupled via, for example, a bus 1102. The bus 1102 may include multiple buses coupling various elements of machine 1100 via various bus technologies and protocols. In an example, the processors 1110 (including, for example, a central processing unit (CPU), a graphics processing unit (GPU), a digital signal processor (DSP), an ASIC, or a suitable combination thereof) may include one or more processors 1112a to 1112n that may execute the instructions 1116 and process data. In some examples, one or more processors 1110 may execute instructions provided or identified by one or more other processors 1110. The term "processor" includes a multi-core processor including cores that may execute instructions contemporaneously. Although FIG. 11 shows multiple processors, the machine 1100 may include a single processor with a single core, a single processor with multiple cores (for example, a multi-core processor), multiple processors each with a single core, multiple processors each with multiple cores, or any combination thereof. In some examples, the machine 1100 may include multiple processors distributed among multiple machines.

The memory/storage 1130 may include a main memory 1132, a static memory 1134, or other memory, and a storage unit 1136, both accessible to the processors 1110 such as via the bus 1102. The storage unit 1136 and memory 1132, 1134 store instructions 1116 embodying any one or more of the functions described herein. The memory/storage 1130 may also store temporary, intermediate, and/or long-term data for processors 1110. The instructions 1116 may also reside, completely or partially, within the memory 1132, 1134, within the storage unit 1136, within at least one of the processors 1110 (for example, within a command buffer or cache memory), within memory at least one of I/O components 1150, or any suitable combination thereof, during execution thereof. Accordingly, the memory 1132, 1134, the storage unit 1136, memory in processors 1110, and memory in I/O components 1150 are examples of machine-readable media.

As used herein, "machine-readable medium" refers to a device able to temporarily or permanently store instructions and data that cause machine 1100 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1116) for execution by a machine 1100 such that the instructions, when executed by one or more processors 1110 of the machine 1100, cause the machine 1100 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1150 may include a wide variety of hardware components adapted to receive input, provide output, produce output, transmit information, exchange information, capture measurements, and so on. The specific I/O components 1150 included in a particular machine will depend on the type and/or function of the machine. For example, mobile devices such as mobile phones may include a touch input device, whereas a headless server or IoT device may not include such a touch input device. The particular examples of I/O components illustrated in FIG. 11 are in no way limiting, and other types of components may be included in machine 1100. The grouping of I/O components 1150 are merely for simplifying this discussion, and the grouping is in no way limiting. In various examples, the I/O components 1150 may include user output components 1152 and user input components 1154. User output components 1152 may include, for example, display components for displaying information (for example, a liquid crystal display (LCD) or a projector), acoustic components (for example, speakers), haptic components (for example, a vibratory motor or force-feedback device), and/or other signal generators. User input components 1154 may include, for example, alphanumeric input components (for example, a keyboard or a touch screen), pointing components (for example, a mouse, a touchpad, or another pointing instrument), tactile input components (for example, a physical button or a touch screen that provides location and/or force of touches or touch gestures), and/or audio input components (for example, a microphone) configured for receiving various user inputs, such as user commands and/or selections.

In some examples, the I/O components 1150 may include biometric components 1156, motion components 1158, environmental components 1160, and/or position components 1162, among a wide array of other components. The biometric components 1156 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facile-based identification). The motion components 1158 may include, for example, acceleration sensors (for example, an accelerometer) and rotation sensors (for example, a gyroscope). The environmental components 1160 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1162 may include, for example, location sensors (for example, a Global Position System (GPS) receiver), altitude sensors (for example, an air pressure sensor from which altitude may be derived), and/or orientation sensors (for example, magnetometers).

The I/O components 1150 may include communication components 1164, implementing a wide variety of technologies operable to couple the machine 1100 to network(s) 1170 and/or device(s) 1180 via respective communicative couplings 1172 and 1182. The communication components 1164 may include one or more network interface components or other suitable devices to interface with the network(s) 1170. The communication components 1164 may include, for example, components adapted to provide wired communication, wireless communication, cellular communication, Near Field Communication (NFC), Bluetooth communication, Wi-Fi, and/or communication via other modalities. The device(s) 1180 may include other machines or various peripheral devices (for example, coupled via USB).

In some examples, the communication components 1164 may detect identifiers or include components adapted to detect identifiers. For example, the communication components 1164 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1162, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for determining a colorimetric value, the system comprising:
    a plurality of ambient color sensors;
    a sensor control module configured to obtain a first plurality of color measurements, each color measurement obtained from a different one of the plurality of ambient color sensors at approximately a same time;

a perceptual color space analysis module configured to, for each color measurement included in the first plurality of color measurements:
    calculate a plurality of perceptual color space coordinates for the color measurement relative to a respective plurality of reference white points,
    calculate a plurality of distances each corresponding to a different one of the plurality of perceptual color space coordinates and based on one or more components of the corresponding perceptual color space coordinate, and
    select the smallest of the plurality of distances as a minimum distance for the color measurement;
a color sensor/measurement selection module configured to select a first set of color measurements from the first plurality of color measurements based on at least the minimum distance selected for each of the first set of color measurements being less than or equal to a threshold distance; and
a color measurement fusion module configured to calculate a first colorimetric value based on the first set of color measurements.

2. The system according to claim 1, wherein:
the first set of color measurements includes a first color measurement and a second color measurement;
the system further comprises a weight calculation module configured to:
    calculate a first weight based on at least the minimum distance selected for the first color measurement, and
    calculate a second weight based on at least the minimum distance selected for the second color measurement;
the system is configured to:
    calculate a first calibrated colorimetric value for the first color measurement, and
    calculate a second calibrated colorimetric value for the second color measurement; and
the color measurement fusion module is configured to determine the first colorimetric value based on a sum of a product of the first weight and the first calibrated colorimetric value and a product of the second weight and the second calibrated colorimetric value.

3. The system according to claim 2, further comprising a lighting cluster selection module configured to, for each color measurement included in the first set of color measurements:
    select an assigned lighting cluster for the color measurement from a plurality of lighting clusters including the assigned lighting cluster based on the color measurement being most similar to the assigned lighting cluster, and
    calculate a similarity of the color measurement to the assigned lighting cluster;
wherein the weight calculation module is configured to:
    calculate the first weight further based on the similarity calculated for the first color measurement, and
    calculate the second weight further based on the similarity calculated for the second color measurement.

4. The system according to claim 1, further comprising a lighting cluster selection module configured to, for each color measurement included in the first plurality of color measurements:
    select an assigned lighting cluster for the color measurement from a plurality of lighting clusters including the assigned lighting cluster based on the color measurement being most similar to the assigned lighting cluster, and
    calculate a similarity of the color measurement to the assigned lighting cluster;
wherein the color sensor/measurement selection module is configured to select the first set of color measurements from the first plurality of color measurements based further on the similarity calculated for each of the first set of color measurements being within a threshold similarity.

5. The system according to claim 4, wherein:
each of the plurality of lighting clusters has a corresponding cluster centroid; and
the lighting cluster selection module configured to perform the selection of an assigned lighting cluster from a plurality of lighting clusters for a color measurement by determining which of the plurality of lighting clusters has a corresponding cluster centroid closest to the color measurement.

6. The system according to claim 4, wherein:
the first set of color measurements includes a first color measurement and a second color measurement;
the system further comprises a weight calculation module configured to:
    calculate a first weight based on at least the similarity calculated for the first color measurement, and
    calculate a second weight based on at least the similarity calculated for the second color measurement;
the system is configured to:
    calculate a first calibrated colorimetric value for the first color measurement, and
    calculate a second calibrated colorimetric value for the second color measurement; and
    the color measurement fusion module is configured to determine the first colorimetric value based on a sum of a product of the first weight and the first calibrated colorimetric value and a product of the second weight and the second calibrated colorimetric value.

7. The system according to claim 6, further comprising a cluster transformation module configured to:
select transformation parameters associated with the assigned lighting cluster selected for the first color measurement; and
calculate the first calibrated colorimetric value by converting the first color measurement using the selected transformation parameters.

8. A method for determining a colorimetric value with multiple ambient color sensors, the method comprising:
obtaining a first plurality of color measurements, each color measurement obtained from a different one of a plurality of ambient color sensors at approximately a same time;
for each color measurement included in the first plurality of color measurements:
    calculating a plurality of perceptual color space coordinates for the color measurement relative to a respective plurality of reference white points,
    calculating a plurality of distances each corresponding to a different one of the plurality of perceptual color space coordinates and based on one or more components of the corresponding perceptual color space coordinate, and
    selecting the smallest of the plurality of distances as a minimum distance for the color measurement;
selecting a first set of color measurements from the first plurality of color measurements based on at least the minimum distance selected for each of the first set of color measurements being less than or equal to a threshold distance; and calculating a first colorimetric value based on the first set of color measurements.

9. The method according to claim 8, wherein:
the first set of color measurements includes a first color measurement and a second color measurement; and
the calculating the first colorimetric value comprises:
    calculating a first weight based on at least the minimum distance selected for the first color measurement,
    calculating a second weight based on at least the minimum distance selected for the second color measurement,
    calculating a first calibrated colorimetric value for the first color measurement,
    calculating a second calibrated colorimetric value for the second color measurement, and
    determining the first colorimetric value based on a sum of a product of the first weight and the first calibrated colorimetric value and a product of the second weight and the second calibrated colorimetric value.

10. The method according to claim 9, further comprising:
for each color measurement included in the first set of color measurements:
    selecting an assigned lighting cluster for the color measurement from a plurality of lighting clusters including the assigned lighting cluster based on the color measurement being most similar to the assigned lighting cluster, and
    calculating a similarity of the color measurement to the assigned lighting cluster;
wherein:
    the first weight is further calculated based on the similarity calculated for the first color measurement, and
    the second weight is further calculated based on the similarity calculated for the second color measurement.

11. The method according to claim 8, further comprising:
for each color measurement included in the first plurality of color measurements:
    selecting an assigned lighting cluster for the color measurement from a plurality of lighting clusters including the assigned lighting cluster based on the color measurement being most similar to the assigned lighting cluster, and
    calculating a similarity of the color measurement to the assigned lighting cluster;
wherein the selecting the first set of color measurements from the first plurality of color measurements is based further on the similarity calculated for each of the first set of color measurements being within a threshold similarity.

12. The method according to claim 11, wherein:
each of the plurality of lighting clusters has a corresponding cluster centroid; and
the selecting an assigned lighting cluster from a plurality of lighting clusters for a color measurement is performed by determining which of the plurality of lighting clusters has a corresponding cluster centroid closest to the color measurement.

13. The method according to claim 11, wherein:
the first set of color measurements includes a first color measurement and a second color measurement; and
the calculating the first colorimetric value comprises:
    calculating a first weight based on at least the similarity calculated for the first color measurement,
    calculating a second weight based on at least the similarity calculated for the second color measurement,
    calculating a first calibrated colorimetric value for the first color measurement,
    calculating a second calibrated colorimetric value for the second color measurement, and
    determining the first colorimetric value based on a sum of a product of the first weight and the first calibrated colorimetric value and a product of the second weight and the second calibrated colorimetric value.

14. The method according to claim 13, wherein the calculating a first calibrated colorimetric value for the first color measurement comprises:
    selecting transformation parameters associated with the assigned lighting cluster selected for the first color measurement; and
    calculating the first calibrated colorimetric value by converting the first color measurement using the selected transformation parameters.

15. One or more machine-readable media including instructions which, when executed by one or more processors, cause the processors to perform the method according to claim 8.

16. A method for determining a colorimetric value with multiple ambient color sensors, the method comprising:
    obtaining a first plurality of color measurements, each color measurement obtained from a different one of a plurality of ambient color sensors at approximately a same time, the first set of color measurements including a first color measurement and a second color measurement;
    for each color measurement included in the first plurality of color measurements:
        calculating a plurality of perceptual color space coordinates for the color measurement relative to a respective plurality of reference white points,
        calculating a plurality of distances each corresponding to a different one of the plurality of perceptual color space coordinates and based on one or more components of the corresponding perceptual color space coordinate, and
        selecting the smallest of the plurality of distances as a minimum distance for the color measurement;
    calculating a first weight based on at least the minimum distance selected for the first color measurement;
    calculating a second weight based on at least the minimum distance selected for the second color measurement;
    calculating a first calibrated colorimetric value for the first color measurement;
    calculating a second calibrated colorimetric value for the second color measurement; and
    calculating a first colorimetric value based on at least a product of the first weight and the first calibrated colorimetric value and a product of the second weight and the second calibrated colorimetric value.

17. The method according to claim 16, further comprising:
for each color measurement included in the first plurality of color measurements:
    selecting an assigned lighting cluster for the color measurement from a plurality of lighting clusters including the assigned lighting cluster based on the color measurement being most similar to the assigned lighting cluster, and calculating a similarity of the color measurement to the assigned lighting cluster;

calculating a third weight based on at least the similarity calculated for the first color measurement; and calculating a fourth weight based on at least the similarity calculated for the second color measurement;

wherein the calculation of the first colorimetric value is based on at least a product of the first weight, third weight, and the first calibrated colorimetric value and a product of the second weight, fourth weight, and the second calibrated colorimetric value.

18. The method according to claim 17, wherein the calculating a first calibrated colorimetric value for the first color measurement comprises:

selecting transformation parameters associated with the assigned lighting cluster selected for the first color measurement; and calculating the first calibrated colorimetric value by converting the first color measurement using the selected transformation parameters.

19. The method according to claim 16, further comprising selecting the first plurality of color measurements from a second plurality of color measurements based on at least the minimum distance selected for each of the first plurality of color measurements being less than or equal to a threshold distance.

20. One or more machine-readable media including instructions which, when executed by one or more processors, cause the processors to perform the method according to claim 16.

* * * * *